United States Patent
Tavares et al.

(10) Patent No.: US 10,798,748 B2
(45) Date of Patent: Oct. 6, 2020

(54) USER EQUIPMENT USING RANDOM ACCESS CHANNEL (RACH) PARAMETERS TO ADJUST TRANSMIT POWER, AND METHOD OF USING THE RACH PARAMETERS TO ADJUST TRANSMIT POWER

(71) Applicant: Alcatel-Lucent USA Inc., Murray Hill, NJ (US)

(72) Inventors: Marcos Tavares, Holmdel, NJ (US); Dirck Uptegrove, Murray Hill, NJ (US); Dragan Samardzija, Holmdel, NJ (US)

(73) Assignee: Nokia of America Corporation, Murray Hill, NJ (US)

( * ) Notice: Subject to any disclaimer, the term of this patent is extended or adjusted under 35 U.S.C. 154(b) by 0 days.

(21) Appl. No.: 16/312,628

(22) PCT Filed: Jun. 5, 2017

(86) PCT No.: PCT/US2017/035870
§ 371 (c)(1),
(2) Date: Dec. 21, 2018

(87) PCT Pub. No.: WO2017/222789
PCT Pub. Date: Dec. 28, 2017

(65) Prior Publication Data
US 2019/0174553 A1    Jun. 6, 2019

Related U.S. Application Data

(63) Continuation of application No. 15/191,756, filed on Jun. 24, 2016, now Pat. No. 9,913,295.

(51) Int. Cl.
*H04W 4/00* (2018.01)
*H04W 74/08* (2009.01)
(Continued)

(52) U.S. Cl.
CPC ......... *H04W 74/0833* (2013.01); *H04L 27/26* (2013.01); *H04L 27/2663* (2013.01);
(Continued)

(58) Field of Classification Search
CPC ..... H04L 27/26; H04L 27/2663; H04L 7/042; H04W 28/02; H04W 74/008; H04W 74/0833
See application file for complete search history.

(56) References Cited

U.S. PATENT DOCUMENTS

| 7,398,108 B2 | 7/2008 | Hondo |
| 2007/0165567 A1 | 7/2007 | Tan et al. |

(Continued)

FOREIGN PATENT DOCUMENTS

| WO | WO-2010/030212 A1 | 3/2010 |
| WO | WO-2014/189286 A1 | 11/2014 |
| WO | WO-2017/222789 A1 | 12/2017 |

OTHER PUBLICATIONS

International Search Report dated Aug. 9, 2017 in related PCT/US2017/035870.
(Continued)

*Primary Examiner* — Minh Trang T Nguyen
(74) *Attorney, Agent, or Firm* — Harness, Dickey & Pierce, P.L.C.

(57) ABSTRACT

The user equipment includes a processor configured to receive a broadcast message, the broadcast message including RACH parameters. The processor transmits a first message following receipt of the broadcast message. The processor receives a second message. The processor transmits a third message, the third message including power settings based on a successful transmission of the first message, and receives a fourth message, the fourth message including contention resolution information that adjusts the RACH (Continued)

parameters. The user equipment decodes RACH parameters and the contention information to obtain decoded RACH parameters, and adjusts an initial transmit power of the user equipment to be a first transmit power based on the decoded RACH parameters.

8 Claims, 30 Drawing Sheets

(51) Int. Cl.
  *H04L 27/26* (2006.01)
  *H04W 28/02* (2009.01)
  *H04W 74/00* (2009.01)
  *H04L 7/04* (2006.01)
(52) U.S. Cl.
  CPC ............. *H04W 28/02* (2013.01); *H04L 7/042* (2013.01); *H04W 74/008* (2013.01)

(56) References Cited

U.S. PATENT DOCUMENTS

| | | | |
|---|---|---|---|
| 2010/0172299 A1* | 7/2010 | Fischer | H04W 74/002 370/328 |
| 2014/0112254 A1 | 4/2014 | Lindoff et al. | |
| 2015/0215968 A1 | 7/2015 | Jiang et al. | |

OTHER PUBLICATIONS

Written Opinion of the International Search Authority dated Aug. 9, 2017 in related PCT/US2017/035870.

De Figueiredo et al. "A Modified CA-CFAR Method for LTE Random Access Detention", 7th International Conference on Signal Processing and Communication Systems, IEEE, Dec. 16, 2013.

Lehtomäki et al., "CFAR Strategies for Channelized Radiometer", IEEE Signal Processing Letters, vol. 12, No. 1, Jan. 2005.

* cited by examiner

Algorithm 1

Prob. Missed Detection vs. Target Rx Power - Traffic Intensity: 250 Preamble / Sector / s ○   PRamp = 0 dB
□   PRamp = 2 dB
△   PRamp = 4 dB
◇   PRamp = 6 dB FCME - Solid Lines
Threshold Scaling - Dashed Lines Algorithm 2 cont.

Algorithm 2 cont.

General Shape of the Scaling Functions $\gamma N_1$ and $\gamma N_2$

PRACH Target Receiver Power vs. Time - Traffic Intensity: 32 Preambles / Sector/ s ---- Threshold Scaling
—— FCME Relations Between the Normalized Threshold $T_{RACH}$
and the Logarithm of the Probability of False Alarm
$Log_{10}(P_{FA})$ for M = 832.

Algorithm 3

Supported RACH Intensity Versus RACH Opportunity Period for 64 Preambles per Sector.

Collision Probability Versus RACH Intensity for 64 Preambles Per Sector.

Algorithm 4

Algorithm 5

Algorithm 6

Algorithm 6 (cont.)

FIG. 24C
Algorithm 6 (cont.)

From FIG. 24B ⑤

Adjust $P_{ramp,RACH}$ to control noise rise $P_{ramp,RACH}(k) = Q_{ramp,}(P_{ramp,RACH}(k-1) + \gamma N_2(\chi_{\gamma 2}) \cdot (R_{max} - R_{[kT]})$ $R_2\_Flag(k) = 1$

Compute $\chi_{\gamma 1}$, and $\chi_{\gamma 2}$ to minimize the effects of ping-pong situations:

$\chi_{\gamma 1} = (\Sigma_{i=max(k-N\gamma,1)}^{k} M_1\_Flag(k)) - (\Sigma_{i=max(k-N\gamma,1)}^{k} R_1\_Flag(k))$ $\chi_{\gamma 2} = (\Sigma_{i=max(k-N\gamma,1)}^{k} M_2\_Flag(k)) - (\Sigma_{i=max(k-N\gamma,1)}^{k} R_2\_Flag(k))$ Go to next sampling period
$K = K + 1$

⑦
FIG. 24A

Algorithm 7

USER EQUIPMENT USING RANDOM ACCESS CHANNEL (RACH) PARAMETERS TO ADJUST TRANSMIT POWER, AND METHOD OF USING THE RACH PARAMETERS TO ADJUST TRANSMIT POWER

CROSS-REFERENCE TO RELATED APPLICATIONS

This application is a national phase under 35 U.S.C. § 371 of PCT International Application No. PCT/US2017/035870 which has an International filing date of Jun. 5, 2017, which claims priority to U.S. application Ser. No. 15/191,756 filed Jun. 24, 2016, the entire contents of each of which are hereby incorporated by reference.

BACKGROUND OF THE INVENTION

Field of the Invention

Example embodiments relate generally to a system and method for controlling network traffic using improved preamble detection and an automation of determined random access channel parameters.

Related Art

FIG. 1 illustrates a conventional 3rd Generation Partnership Project Long-Term Evolution (3GPP LTE) network 10. The network 10 includes an Internet Protocol (IP) Connectivity Access Network (IP-CAN) 100 and an IP Packet Data Network (IP-PDN) 1001. The IP-CAN 100 generally includes: a serving gateway (SGW) 101; a packet data network (PDN) gateway (PGW) 103; a policy and charging rules function (PCRF) 106; a mobility management entity (MME) 108 and E-UTRAN Node B (eNB) 105 (i.e., base station, for the purposes herein the terms base station and eNB may be used interchangeably). Although not shown, the IP-PDN 1001 portion of the EPS may include application or proxy servers, media servers, email servers, etc.

Within the IP-CAN 100, the eNB 105 is part of what is referred to as an Evolved Universal Mobile Telecommunications System (UMTS) Terrestrial Radio Access Network (EUTRAN), and the portion of the IP-CAN 100 including the SGW 101, the PGW 103, the PCRF 106, and the MME 108 is referred to as an Evolved Packet Core (EPC). Although only a single eNB 105 is shown in FIG. 1, it should be understood that the EUTRAN may include any number of eNBs. Similarly, although only a single SGW, PGW and MME are shown in FIG. 1, it should be understood that the EPC may include any number of these core network elements.

The eNB 105 provides wireless resources and radio coverage for one or more user equipments (UEs) 110. That is to say, any number of UEs 110 may be connected (or attached) to the eNB 105. The eNB 105 is operatively coupled to the SGW 101 and the MME 108.

The SGW 101 routes and forwards user data packets, while also acting as the mobility anchor for the user plane during inter-eNB handovers of UEs. The SGW 101 also acts as the anchor for mobility between 3rd Generation Partnership Project Long-Term Evolution (3GPP LTE) and other 3GPP technologies. For idle UEs 110, the SGW 101 terminates the downlink data path and triggers paging when downlink data arrives for UEs 110.

The PGW 103 provides connectivity between UE 110 and the external packet data networks (e.g., the IP-PDN) by being the point of entry/exit of traffic for the UE 110. As is known, a given UE 110 may have simultaneous connectivity with more than one PGW 103 for accessing multiple PDNs.

The PGW 103 also performs policy enforcement, packet filtering for UEs 110, charging support, lawful interception and packet screening, each of which are well-known functions. The PGW 103 also acts as the anchor for mobility between 3GPP and non-3GPP technologies, such as Worldwide Interoperability for. Microwave Access (WiMAX) and 3rd Generation Partnership Project 2 (3GPP2 (code division multiple access (CDMA) 1× and Enhanced Voice Data Optimized (EvDO)).

Still referring to FIG. 1, eNB 105 is also operatively coupled to the MME 108. The MME 108 is the control-node for the EUTRAN, and is responsible for idle mode UE 110 paging and tagging procedures including retransmissions. The MME 108 is also responsible for choosing a particular SGW for a UE during initial attachment of the UE to the network, and during intra-LTE handover involving Core Network (CN) node relocation. The MME 108 authenticates UEs 110 by interacting with a Home Subscriber Server (HSS), which is not shown in FIG. 1.

Non Access Stratum (NAS) signaling terminates at the MME 108, and is responsible for generation and allocation of temporary identities for UEs 110. The MME 108 also checks the authorization of a UE 110 to camp on a service provider's Public Land Mobile Network (PLMN), and enforces UE 110 roaming restrictions. The MME 108 is the termination point in the network for ciphering/integrity protection for NAS signaling, and handles security key management.

The MME 108 also provides control plane functionality for mobility between LTE and 2G/3G access networks with an interface from the SGSN (not shown) terminating at the MME 108.

The Policy and Charging Rules Function (PCRF) 106 is the entity that may access subscriber databases, make policy decisions and set charging rules for the subscriber.

FIG. 2 illustrates a conventional E-UTRAN Node B (eNB) 105. The eNB 105 includes: a memory 225; a processor 210; a scheduler 215; wireless communication interfaces 220; radio link control (RLC) buffers 230 for each bearer; and a backhaul interface 235. The processor 210 may also be referred to as a core network entity processing circuit, an EPC entity processing circuit, etc. The processor 210 may consist of one or more core processing units, either physically coupled together or distributed. The processor 210 controls the function of eNB 105 (as described herein), and is operatively coupled to the memory 225 and the communication interfaces 220. While only one processor 210 is shown in FIG. 2, it should be understood that multiple processors may be included in a typical eNB 105. The functions performed by the processor may be implemented using hardware. Such hardware may include one or more Central Processing Units (CPUs), digital signal processors (DSPs), application-specific-integrated-circuits, field programmable gate arrays (FPGAs) computers or the like. The term processor, used throughout this document, may refer to any of these example implementations, though the term is not limited to these examples. With a Virtual Radio Access Network (VRAN) architecture various functions eNB components may be distributed across multiple processing circuits and multiple physical nodes within VRAN cloud.

The eNB 105 may include one or more cells or sectors serving UEs 110 within individual geometric coverage sector areas. Each cell individually may contain elements depicted in FIG. 2. Throughout this document the terms eNB, cell or sector shall be used interchangeably.

Still referring to FIG. 2, the wireless communication interfaces 220 include various interfaces including one or more transmitters/receivers connected to one or more antennas to transmit/receive wirelessly control and data signals to/from UEs 110. Backhaul interface 235 is the portion of eNB 105 that interfaces with SGW 101, MME 108, other eNBs, or interface to other EPC network elements and/or RAN elements within IP-CAN 100. The scheduler 215 schedules control and data communications that are to be transmitted and received by the eNB 105 to and from UEs 110. The memory 225 may buffer and store data that is being processed at eNB 105, transmitted and received to and from eNB 105.

Scheduler 215 may make physical resource block (PRB) allocation decisions based upon a Quality of Service (QoS) Class Identifier (QCI), which represents traffic priority hierarchy. There are nine QCI classes currently defined in LTE, with 1 representing highest priority and 9 representing the lowest priority. QCIs 1 to 4 are reserved for Guaranteed Bitrate (GBR) classes for which the scheduler maintains certain specific data flow QoS characteristics. QCIs 5 to 9 are reserved for various categories of Best Effort traffic.

A random access channel (RACH) enables user equipments (UEs) 110 to perform tasks such as initially accessing the communication network 10, uplink synchronization, handovers between cells, and recovery from failed links. Therefore, an achievement of an optimal random access performance through an efficient RACH signature detection algorithm, and use of a correct configuration of the RACH parameters, is crucial to optimizing performance of the communication network.

Conventional random access channel (RACH) preamble detectors, which takes place in the wireless interface 220 of an eNB 105, relies on an estimation of a noise floor in order to set a preamble detection threshold. Because of the non-stationary nature of signals involved in RACH preamble detection due to random RACH transmissions, unpredictable scheduling decisions and non-Gaussian interference, sufficiently accurate estimation of the noise floor may be an unachievable task and this may lead to an underperforming cellular system.

Conventional solutions for configuring RACH parameters generally consist of static parameter settings based on engineering best practices. That is to say, these static parameter settings may be performed via link-budget, traffic engineering calculations and/or field performance measurements. However, a static parameter configuration solution may experience several shortcomings. First, static parameter configurations may not have the ability to overcome possible mismatches between the calculations used to set the parameters and the realities of a real-world deployment. Second, static configurations may not adapt to changing conditions in a cellular network, especially with regard to interference and traffic intensity. Third, static configurations may not autonomously tune the RACH parameters to reflect changes in the network architecture over time, such as cell splitting and the insertion of small cells.

Conventional solutions do not efficiently avoid interference of communication channels, optimize RACH coverage, minimize delays related to call setup and handover, reduce network signaling overhead, and obtain an optimal resource allocation balance between random access and other network communication needs. Additionally, high operational expenditures are often experienced in order to maintain communication networks when the RACH parameters are statically configured because frequent human intervention is generally required.

SUMMARY OF INVENTION

At least one example embodiment relates to a method of preamble detection to control network traffic in a communication network.

In one example embodiment, the method of preamble detection to control network traffic in a communication network includes detecting, by at least a first processor of at least a first network node, physical random access channel (RACH) preambles, by performing the steps of, computing a correlation power profile based on a set of received RACH preambles, sorting correlation power profile values, computing a weight factor for each of the correlation power profile values based on a normalized RACH detection threshold, selecting outlier peaks of the correlation power profile values based on the weight factor, mapping the outlier peaks to the first set of RACH signatures in order to identify at least one UE that is associated with one of the received RACH preambles; and controlling, by the first processor, the network traffic of network communications associated with the at least one identified UE.

In one example embodiment, the method includes detecting of the RACH preambles by using a forward consecutive mean excision (FCME) method.

In one example embodiment, the detecting of the RACH preambles further includes, collecting noise rise information and preamble miss information for a set of transmitted RACH preambles, computing an overall average noise rise for the communication network based on the collected noise rise information, computing an average missed detection ratio for the communication network using the collected preamble miss information, determining a target receiver power and a power ramp-up using the average nose rise and the average missed detection ratio.

In one example embodiment, the detecting of the RACH preambles further includes determining the normalized RACH detection threshold by performing the steps of, collecting preamble false alarm ratio information, computing an average false alarm rate for the communication network based on the preamble false alarm ratio information, and determining the normalized RACH detection threshold based on the average false alarm rate, wherein the controlling the network traffic further includes, broadcasting the normalized RACH detection threshold to UEs of the communication network.

In one example embodiment, the method further includes collecting a contention ratio information, computing an average contention ratio for the communication network based on the collected contention ratio information, determining the opportunity period based on the average contention ratio, wherein the controlling the network traffic further includes, broadcasting the opportunity period to UEs of the communication network.

In one example embodiment, the method includes repeating the steps of collecting noise rise information and preamble miss information, and repeating the steps of computing an overall average noise rise and an average missed detection ratio until the determined target receiver power and the power ramp-up remain constant; wherein the controlling the network traffic further includes, broadcasting the target receiver power and a power ramp-up to UEs of the communication network, and wherein the detecting of the RACH preambles further includes determining the normalized RACH detection threshold, once the determined target receiver power and the power ramp-up remain constant, by performing the steps of, collecting preamble false alarm ratio information, computing an average false alarm rate for the communication network based on the preamble false alarm ratio information, and determining the normalized RACH detection threshold based on the average false alarm rate, wherein the controlling the network traffic further includes, broadcasting the normalized RACH detection threshold to UEs of the communication network.

In one example embodiment, the method further includes repeating the steps of collecting preamble false alarm ratio information and computing an average false alarm rate until the determined normalized RACH detection threshold remains constant; and wherein the detecting of the RACH preambles further includes determining an opportunity period, once the determined target receiver power, the power ramp-up, and the normalized RACH detection threshold remain constant, by performing the steps of, collecting a contention ratio information, computing an average contention ratio for the communication network based on the collected contention ratio information, determining the opportunity period based on the average contention ratio, wherein the controlling the network traffic further includes, broadcasting the opportunity period to UEs of the communication network.

In one example embodiment, the method includes the at least a first processor of at least a first network node being a plurality of processors, each of the plurality of the processors being associated with a network node dedicated to a respective sector within the communication network, the detecting of the RACH preambles further includes, each of the processors collecting noise rise information and preamble miss information for a set of transmitted RACH preambles for the respective sector, each of the processors computing an overall average noise rise based on the collected noise rise information for the respective sector, each of the processors computing an average missed detection ratio, for the respective sectors, using the collected preamble miss information from each respective sector, each of the processors sharing the overall average noise rise and the average missed detection ratio with at least one of the other processors, of the plurality of processors, which is a neighbor processor, each of the processors determining a target receiver power and a power ramp-up, for the respective sectors, using the shared average nose rise and the shared average missed detection ratio.

In one example embodiment, the method further includes repeating the steps of each of the processors of the respective sectors collecting noise rise information and preamble miss information, and repeating the step of computing an overall average noise rise and an average missed detection ratio until the determined target receiver power and the power ramp-up remain constant; wherein the controlling the network traffic further includes, each of the processors broadcasting the target receiver power and a power ramp-up to UEs for the respective sectors, and wherein the detecting of the RACH preambles further includes determining the normalized RACH detection threshold, once the determined target receiver power and the power ramp-up remain constant, by performing the steps of, each of the processors collecting preamble false alarm ratio information for the respective sectors, each of the processor computing an average false alarm rate, for the respective sectors, based on the preamble false alarm ratio information, and each of the processors determining the normalized RACH detection threshold, for the respective sectors, based on the average false alarm rate, wherein the controlling of the network traffic further includes each of the processors broadcasting the normalized RACH detection threshold to UEs for the respective sectors.

In one example embodiment, the method further includes repeating the steps of each of the processors of the respective sectors collecting preamble false alarm ratio information and computing an average false alarm rate, until the determined normalized RACH detection threshold remains constant; wherein the detecting of the RACH preambles further includes determining the opportunity period, once the determined normalized RACH detection threshold remains constant, by performing the steps of, each of the processors collecting a contention ratio information for the respective sectors, computing an average contention ratio for the respective sectors based on the collected contention ratio information, each of the processors determining the opportunity period, for the respective sectors, based on the average contention ratio; and wherein the controlling of the network traffic further includes each of the processors broadcasting the target receiver power, the power ramp-up, and the opportunity period to the UEs for the respective sectors.

At least another example embodiment relates to at least a first network node in a communication network.

In one example embodiment, the at least a first network node includes at least a first processor, configured to, detect physical random access channel (RACH) preambles, by performing the steps of, computing a correlation power profile based on a set of received RACH preambles, sorting correlation power profile values, computing a weight factor for each of the correlation power profile values based on a normalized RACH detection threshold, selecting outlier peaks of the correlation power profile values based on the weight factor, mapping the outlier peaks to the first set of RACH signatures in order to identify at least one UE that is associated with one of the received RACH preambles; and control network traffic of network communications associated with the at least one identified UE.

In one example embodiment, the at least a first processor is further configured to detect the RACH preambles by using a forward consecutive mean excision (FCME) method.

In one example embodiment, the at least a first processor is further configured to detect the RACH preambles by, collecting noise rise information and preamble miss information for a set of transmitted RACH preambles, computing an overall average noise rise for the communication network based on the collected noise rise information, computing an average missed detection ratio for the communication network using the collected preamble miss information, determining a target receiver power and a power ramp-up using the average nose rise and the average missed detection ratio.

In one example embodiment, the at least a first processor is further configured to detect the RACH preambles by determining the normalized RACH detection threshold by performing the steps of, collecting preamble false alarm ratio information, computing an average false alarm rate for the communication network based on the preamble false alarm ratio information, and determining the normalized RACH detection threshold based on the average false alarm rate, wherein the at least a first processor is further configured to control the network traffic by, broadcasting the normalized RACH detection threshold to UEs of the communication network.

In one example embodiment, the at least a first processor is further configured to, collect a contention ratio information, compute an average contention ratio for the communication network based on the collected contention ratio information, determine the opportunity period based on the average contention ratio, wherein the at least a first processor is further configured to control the network traffic by, broadcasting the opportunity period to UEs of the communication network.

In one example embodiment, the at least a first processor is further configured to, repeat the steps of collecting noise rise information and preamble miss information, and repeating the steps of computing an overall average noise rise and an average missed detection ratio until the determined target receiver power and the power ramp-up remain constant, wherein the at least a first processor is further configured to control the network traffic by, broadcasting the target receiver power and a power ramp-up to UEs of the communication network, wherein the at least a first processor is further configured to detect the RACH preambles by determining the normalized RACH detection threshold, once the determined target receiver power and the power ramp-up remain constant, by performing the steps of, collecting preamble false alarm ratio information, computing an average false alarm rate for the communication network based on the preamble false alarm ratio information, and determining the normalized RACH detection threshold based on the average false alarm rate, the at least a first processor is further configured to control the network traffic by, broadcasting the normalized RACH detection threshold to UEs of the communication network.

In one example embodiment, the at least a first processor is further configured to, repeat the steps of collecting preamble false alarm ratio information and computing an average false alarm rate until the determined normalized RACH detection threshold remains constant, wherein the at least a first processor is further configured to detect the RACH preambles by determining an opportunity period, once the determined target receiver power, the power ramp-up, and the normalized RACH detection threshold remain constant, by performing the steps of, collecting a contention ratio information, computing an average contention ratio for the communication network based on the collected contention ratio information, determining the opportunity period based on the average contention ratio, wherein the at least a first processor is further configured to control the network traffic by, broadcasting the opportunity period to UEs of the communication network.

In one example embodiment, wherein the at least a first processor includes a plurality of processors, each of the plurality of the processors being associated with a respective sector within the communication network, the at least a first processor is further configured to detect the RACH preambles by, each of the processors collecting noise rise information and preamble miss information for a set of transmitted RACH preambles for the respective sector, each of the processors computing an overall average noise rise based on the collected noise rise information for the respective sector, each of the processors computing an average missed detection ratio, for the respective sectors, using the collected preamble miss information from each respective sector, each of the processors sharing the overall average noise rise and the average missed detection ratio with at least one of the other processors, of the plurality of processors, which is a neighbor processor, each of the processors determining a target receiver power and a power ramp-up, for the respective sectors, using the shared average nose rise and the shared average missed detection ratio.

In one example embodiment, wherein the at least a first processor is further configured to, repeat the steps of each of the processors of the respective sectors collecting noise rise information and preamble miss information, and repeating the step of computing an overall average noise rise and an average missed detection ratio until the determined target receiver power and the power ramp-up remain constant, wherein the at least a first processor is further configured to control the network traffic by, each of the processors broadcasting the target receiver power and a power ramp-up to UEs for the respective sectors, and wherein the at least a first processor is further configured to detect the RACH preambles by determining the normalized RACH detection threshold, once the determined target receiver power and the power ramp-up remain constant, by performing the steps of, each of the processors collecting preamble false alarm ratio information for the respective sectors, each of the processor computing an average false alarm rate, for the respective sectors, based on the preamble false alarm ratio information, and each of the processors determining the normalized RACH detection threshold, for the respective sectors, based on the average false alarm rate, wherein the at least a first processor is further configured to control the network traffic by each of the processors broadcasting the normalized RACH detection threshold to UEs for the respective sectors.

In one example embodiment, wherein the at least a first processor is further configured to, repeat the steps of each of the processors of the respective sectors collecting preamble false alarm ratio information and computing an average false alarm rate, until the determined normalized RACH detection threshold remains constant, wherein the at least a first processor is further configured to detect the RACH preambles by determining the opportunity period, once the determined normalized RACH detection threshold remains constant, by performing the steps of, each of the processors collecting a contention ratio information for the respective sectors, computing an average contention ratio for the respective sectors based on the collected contention ratio information, each of the processors determining the opportunity period, for the respective sectors, based on the average contention ratio; and wherein the at least a first processor is further configured to control the network traffic by each of the processors broadcasting the target receiver power, the power ramp-up, and the opportunity period to the UEs for the respective sectors.

BRIEF DESCRIPTION OF THE DRAWINGS

The above and other features and advantages of example embodiments will become more apparent by describing in detail, example embodiments with reference to the attached drawings. The accompanying drawings are intended to depict example embodiments and should not be interpreted to limit the intended scope of the claims. The accompanying drawings are not to be considered as drawn to scale unless explicitly noted.

FIG. 24C illustrates a decentralized optimization of power, in accordance with an example embodiment;

DETAILED DESCRIPTION

Figure 1:
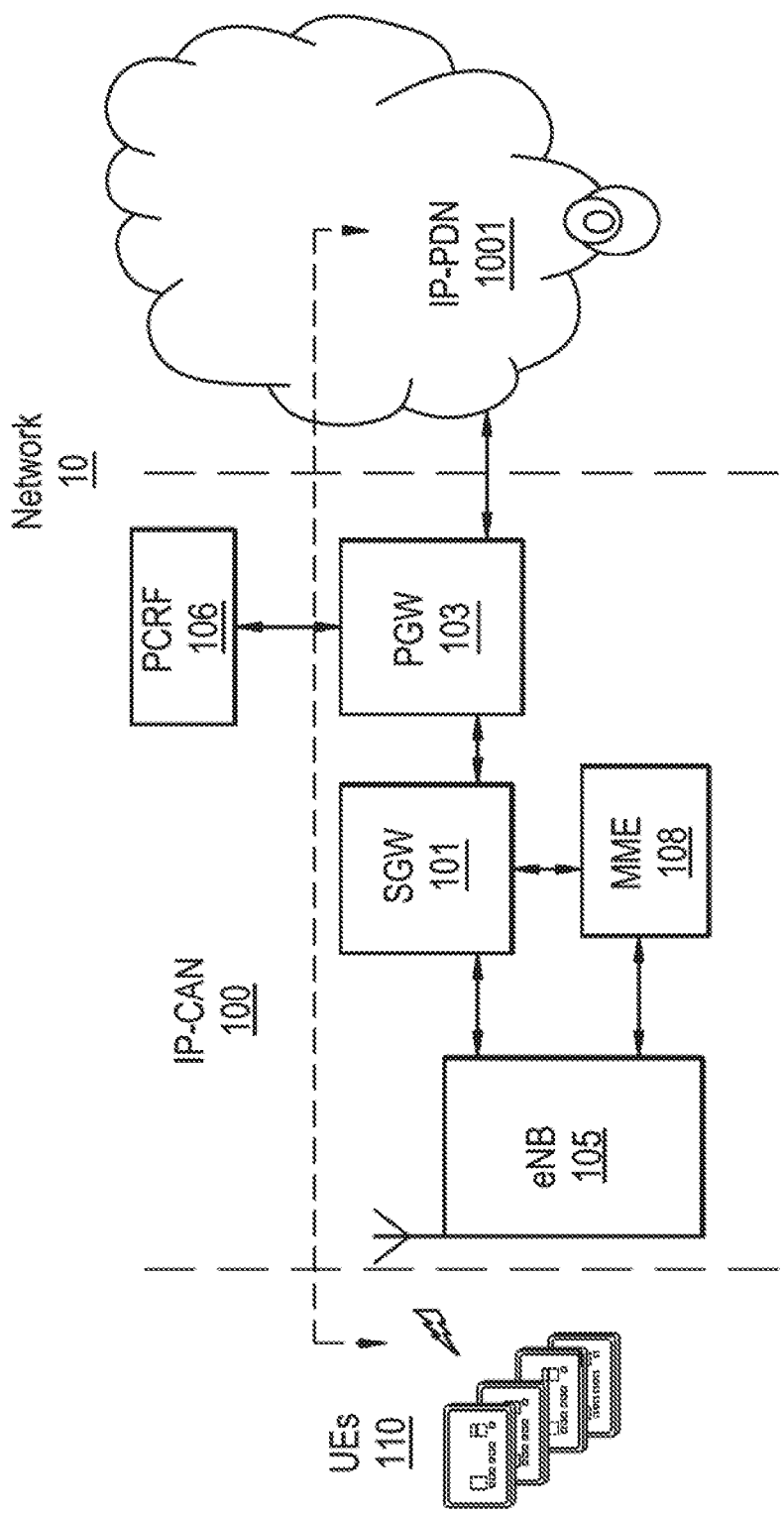
FIG. 1 illustrates a conventional 3rd Generation Partnership Project Long-Term Evolution (3GPP LTE) network.
Figure 2:
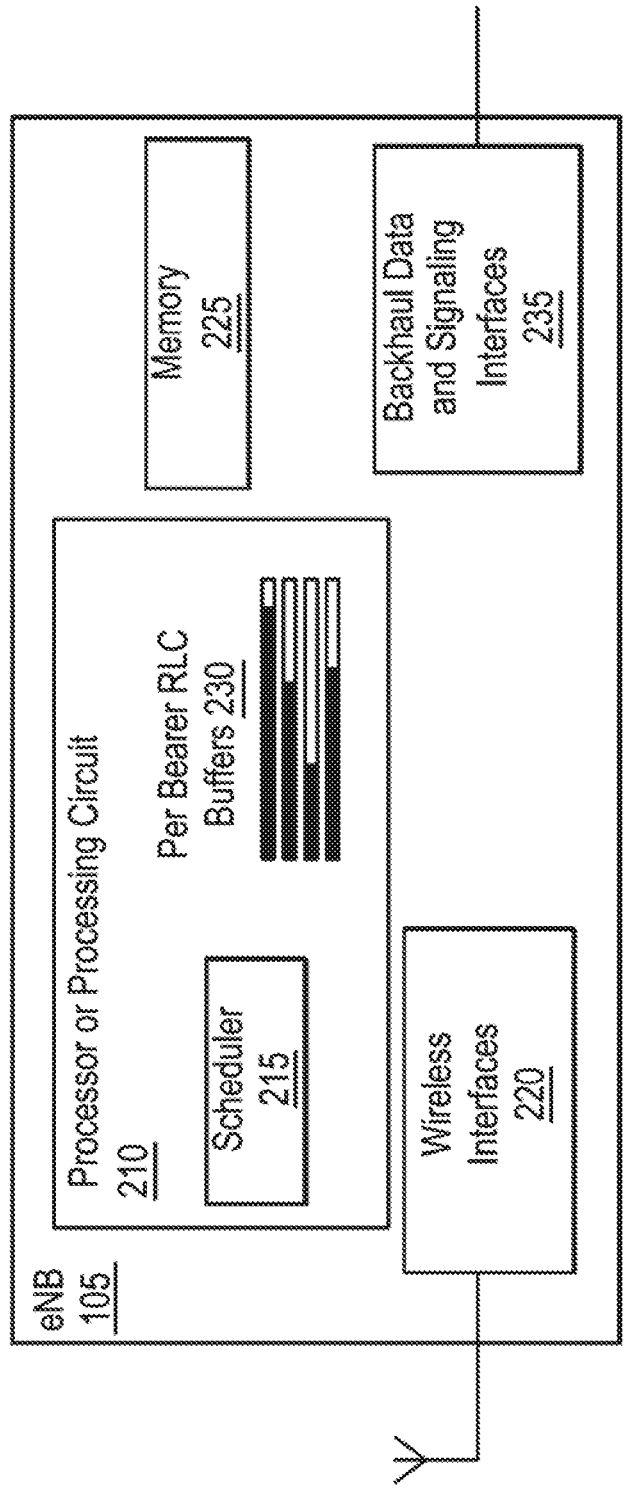
FIG. 2 illustrates a conventional E-UTRAN Node B (eNB)

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium, such as a non-transitory storage medium. A processor(s) may perform the necessary tasks.

Specific structural and functional details disclosed herein are merely representative for purposes of describing example embodiments. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent." etc.).

The terminology used herein is for the purpose of describing particular embodiments only and is not intended to be limiting of example embodiments. As used herein, the singular forms "a." "an" and "the" are intended to include the plural forms as well, unless the context clearly indicates otherwise. It will be further understood that the terms "comprises," "comprising." "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be any non-transitory storage medium such as magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

General Methodology:

The achievement of optimal random access performance through efficient RACH signature detection algorithms and the correct configuration of the RACH parameters, which may be adapted to diverse situations encountered in practical deployment of cellular networks, may meet at least the following five objectives.

A) Avoidance of excessive interference on communication channels;

B) Achievement of an intended RACH coverage;

C) Minimization of delays related to call setup, handovers, etc.;

D) Reduction of network signaling overhead related to identification assignments, resource grants, etc.; and E) Obtainment of a proper resource allocation balance between random access and other communication needs.

The five objectives, listed above, may be quantified in terms of metrics, and these metrics are referred to as 'network metrics' throughout the remainder of this document. Due to the multi-dimensionality of network problems associated with the simultaneous optimization of several parameters, and due to the dynamic nature of cellular networks (with varying traffic loads and changing interference patterns), automated and adaptive RACH parameter setting methods may assist proper network operations. More specifically, some or all of the following parameters may be optimized via the example embodiment. Throughout the remainder of this document, these parameters are referred to as 'RACH parameters.'

1) RACH initial target receive power $P_{0,RACH}$;

2) RACH transmit power ramp-up $P_{ramp,RACH}$;

3) Normalized RACH preamble detection threshold $T_{RACH}$;

4) RACH resource allocation period $\tau_{RACH}$.

Within the context of the example embodiments, the optimization of RACH parameters 1) and 2) may directly affect objectives A), B). C); the optimization of RACH parameter 3) may directly affect objectives C) and D); and the optimization of RACH parameter 4) may directly affect objectives A), C) and E). For this reason, example embodiments provide an adaptive RACH parameter optimization solution that may be designed to handle performance constraints which are concurrently affected by the RACH parameters 1) through 4).

Structural Embodiment

Figure 3:
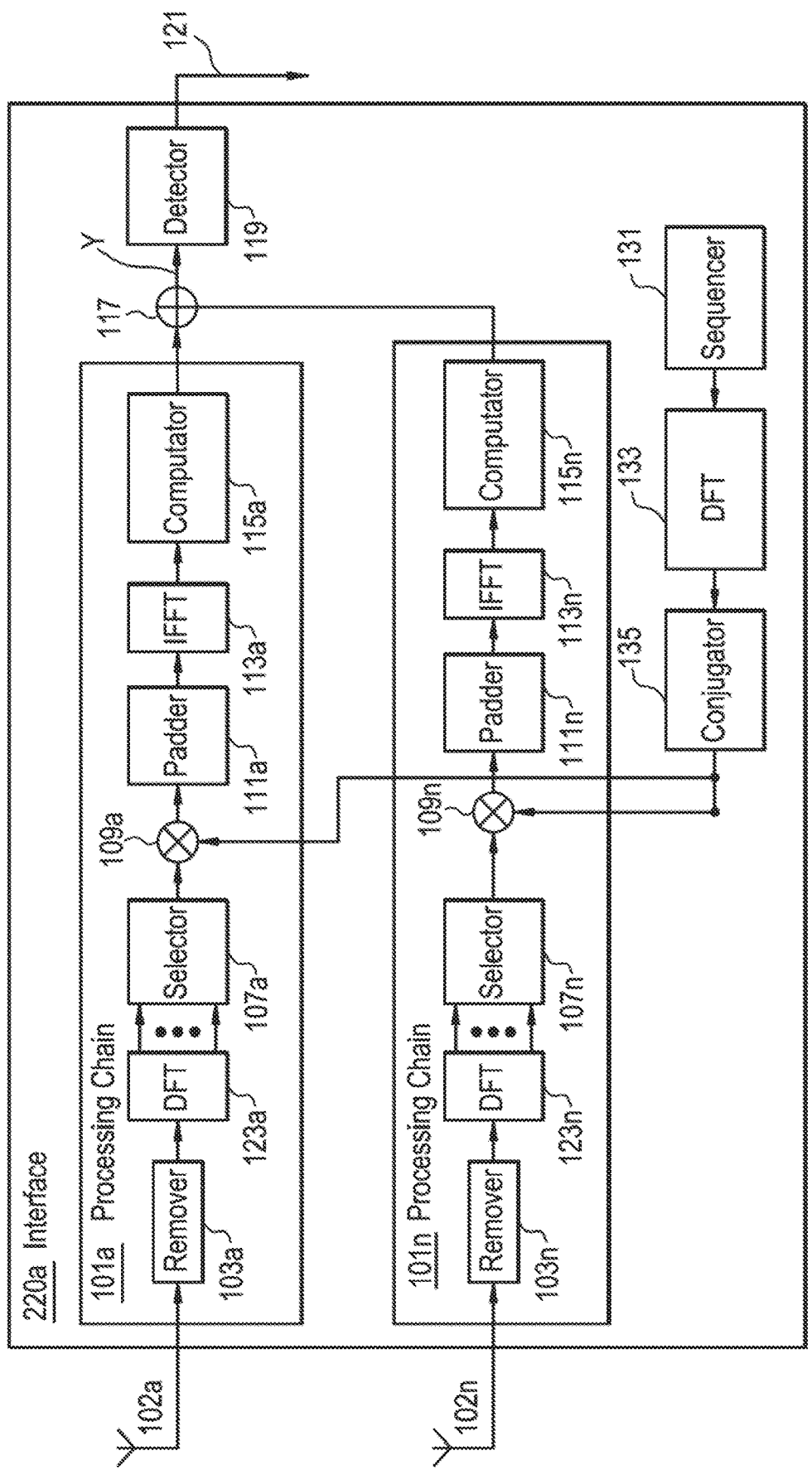
FIG. 3 illustrates a wireless interface within a reconfigured eNB, in accordance with an example embodiment.
Figure 4:
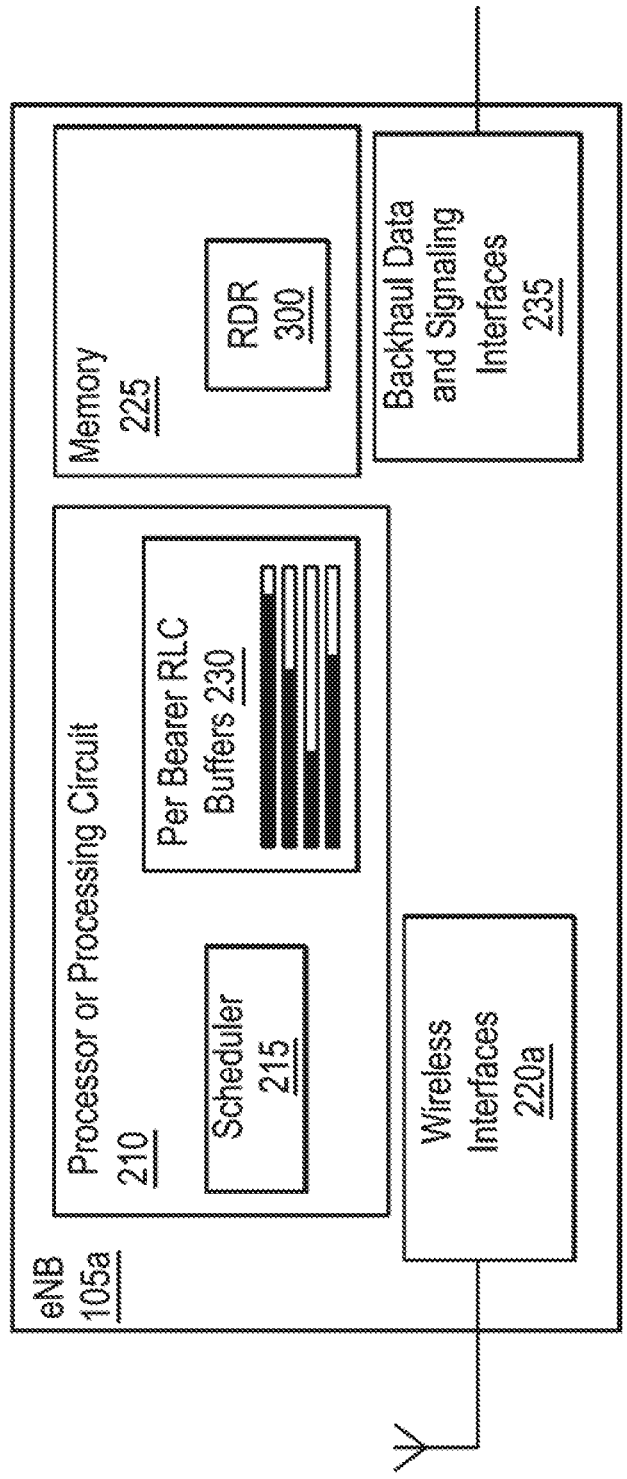
FIG. 4 illustrates a reconfigured eNB, in accordance with an example embodiment.

FIG. 3 illustrates a wireless interface 220a that may be included in a reconfigured eNB 105a (see FIG. 4). The wireless interface 220a may include multiple antenna signal processing chains (101a through 101n). While multiple chains 101 may be included, for simplicity only a single chain 101a will be described here, for brevity sake. As shown in FIG. 3, the interface 220a may include a receiver antenna 102a that receives data and information that is sent through the chain 101a. The chain 101a may include a cyclic prefix remover 103a, and a discrete Fourier transformation (DFT) 123a with length N_DFT. The value of N_DFT may depend on a sampling rate of the system (for example, a system with 20 MHz bandwidth may include a value of N_DFT that is equal to 24576). The chain 101a may also include a subcarrier selector 107a, a symbol-by-symbol complex multiplier 109a and a zero-padder 111a that performs zero-padding (i.e., the padder 111a may insert a sequence of zeros at an end of the sequence symbols being processed, such that a total length of the signal may fit the IFFT with a length N_cor). An inverse fast Fourier transformation (IFFT) 113a may perform an inverse fast Fourier transformation (IFFT) with length N_cor. The value N_cor may be greater than a length of the RACH preamble in symbols (i.e. 839). Typically, N_cor may be set to 1024. A symbol-by-symbol computator 115a may perform a symbol-by-symbol computation of the squared absolute value of each symbol. An adder 117 may perform a symbol-by-symbol addition of the symbols computed by each antenna signal processing chain 101. A signature detection block 119 may then perform signature detection based on the random variable Y (leaving the adder 117). That is to say, the signature detection block 119 may search and classify the peaks in the correlation power profile represented by Y. A generator 131 may generate a prime-length Zadoff-Chu root sequence according to 3GPP Technical Specification 36.211, 'Physical Channels and Modulation'. A discrete Fourier transformer 133 may perform a discrete Fourier transform (DFT) with length N_ZC on complex symbols generated by the sequencer 131. Typically, a length N_ZC may be equal to a value 839. A conjugator 135 may perform a symbol-by-symbol complex conjugation operation of the symbols leaving the discrete Fourier transformer 133. The signals 121 leaving the interface 220a may be signals corresponding to the signatures detected at the eNB 105a.

FIG. 4 illustrates a reconfigured eNB 105a that includes the wireless interface 220a of FIG. 3 (described above). The eNB 105a includes a RACH Detection Routine (RDR) 300 that may include the algorithms and method step information that the processor 210 may run and/or perform in order to perform the methods illustrated in FIGS. 6, 11A-11C, 18, 21-22, 24A-24C, and 25-26 (see the description below). The processor 210 also controls the function of the components of interface 220a shown in FIG. 3.

Figure 5:
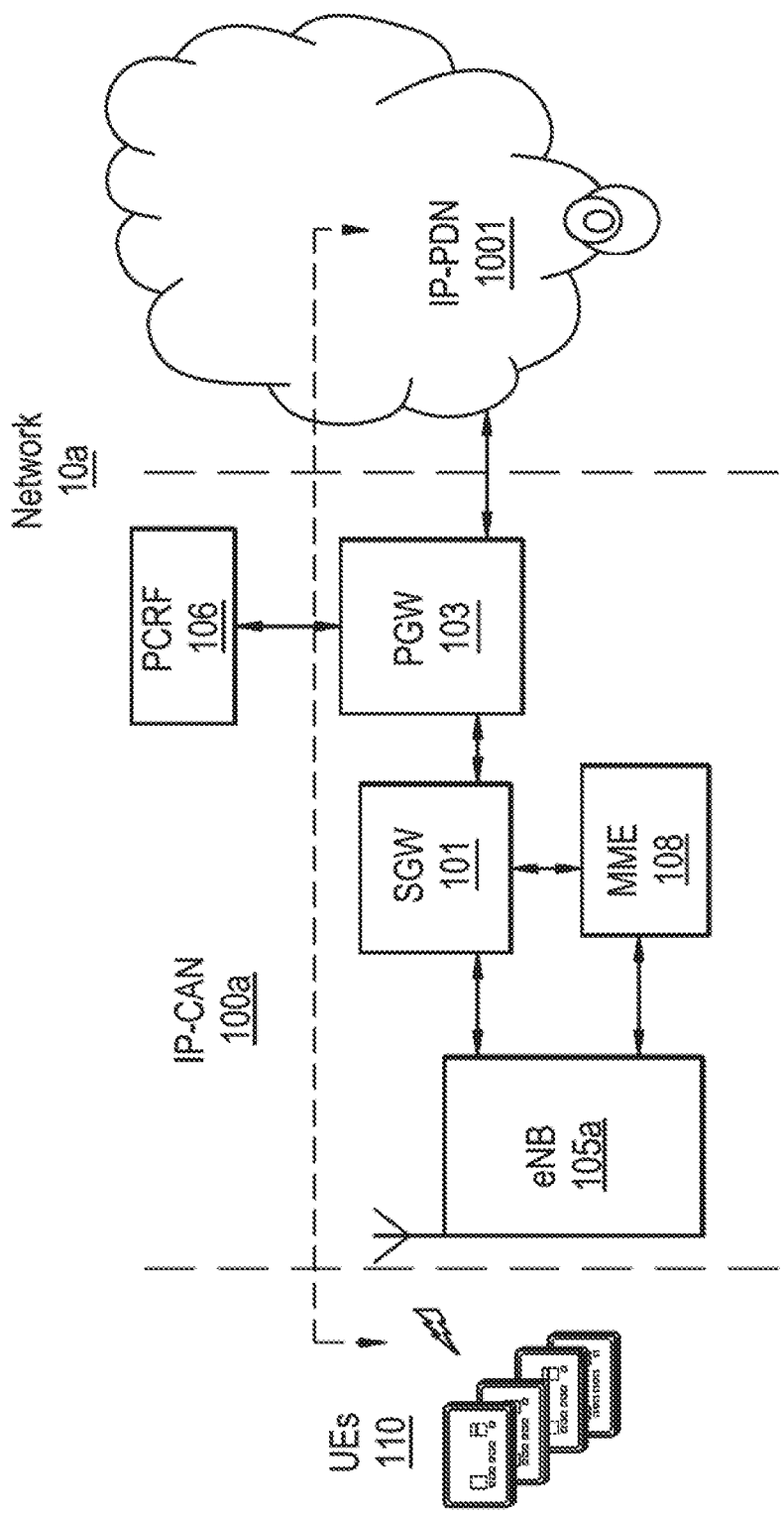
FIG. 5 illustrates a reconfigured 3GPP LTE network, in accordance with an example embodiment.

FIG. 5 illustrates a reconfigured network 10a that includes the reconfigured eNB 105a (shown in FIG. 4).

RACH Signature Detection Method:

Relevant to the characterization of the RACH signature detection algorithm is a random variable Y (transmitted from adder 117 of FIG. 3), which may be a vector of length $N_{cor}$, i.e., $Y=(Y_1, Y_2, \ldots, Y_{N_{cor}})$, described as follows.

$$Y_j = \frac{1}{2N_{RX}} \sum_{k=1}^{N_{RX}} |X_{k,j}|^2, 1 \le j \le N_{cor},$$ Equation 1

Where $N_{RX}$ may be a number of receiver antennas at the eNB 105a and $X_k$ may be assumed to be a complex, zero-mean with variance $\sigma^2$.

Using Equation 1, the distribution of the random variable represented by each $Y_j$ may be approximated by a chi-squared distribution with $2N_{RX}$ degrees of freedom. After normalization (by making $\sigma^2=1$), the cumulative distribution function (CDF) may be written as shown below.

$$Q_{\chi^2, 2N_{RX}}(y) = 1 - \exp(-N_{RX} y) \cdot \sum_{k=0}^{N_{RX}-1} \frac{(N_{RX} y)^k}{k!}$$ Equation 2

Assuming that M is a number of metrics to be searched in the correlation power profile represented by Y, a probability that all M metrics are below a normalized threshold value $T_{RACH}$ may be given by $[Q_{\chi^2, 2N_{RX}}(T_{RACH})]^M$. Therefore, the probability that one or more metrics are above $T_{RACH}$ may be defined as probability of false alarm $P_{FA}$, as shown below.

$$P_{FA} = 1 - [Q_{\chi^2, 2N_{RX}}(T_{RACH})]^M$$ Equation 3

By setting $P_{FA}$ to a particular value, $T_{RACH}$ may be determined numerically using Equations 2 and 3. As an example, Table 1 shows the normalized threshold values $T_{RACH}$ for M=13·64=832 and several combinations of $N_{RX}$ and $P_{FA}$ values.

TABLE 1

| $P_{FA}$ | 0.01 | 0.01 | 0.01 | 0.001 | 0.001 | 0.001 |
|---|---|---|---|---|---|---|
| $N_{RX}$ | 1 | 2 | 4 | 1 | 2 | 4 |
| $T_{RACH}$ | 13.63 | 8.24 | 5.28 | 15.93 | 9.46 | 5.94 |

In a conventional implementation of a signature detection procedure, a normalized threshold $T_{RACH}$ generally needs to be scaled by a noise floor of the correlation power profile Y in order to provide an actual threshold value $T'_{RACH}$ to be used in the detection. However, because of the non-stationary nature of Y, due to random RACH transmissions, unpredictable scheduling decisions, and non-Gaussian interference, estimating the noise floor may be difficult, and may lead to inaccurate results for $T'_{RACH}$. Therefore, use of a detection algorithm which is blind with respect to the noise floor, may be advantageous. Below is an algorithm (Algorithm 1) that describes signature detection based on a forward consecutive mean excision (FCME) method. Inputs for this algorithm include a correlation power profile $Y=(Y_1, Y_2, \ldots, Y_{N_{cor}})$, a normalized RACH detection threshold ($T_{RACH}$), and an initial size of a set that does not contain outliers (I).

Figure 6:
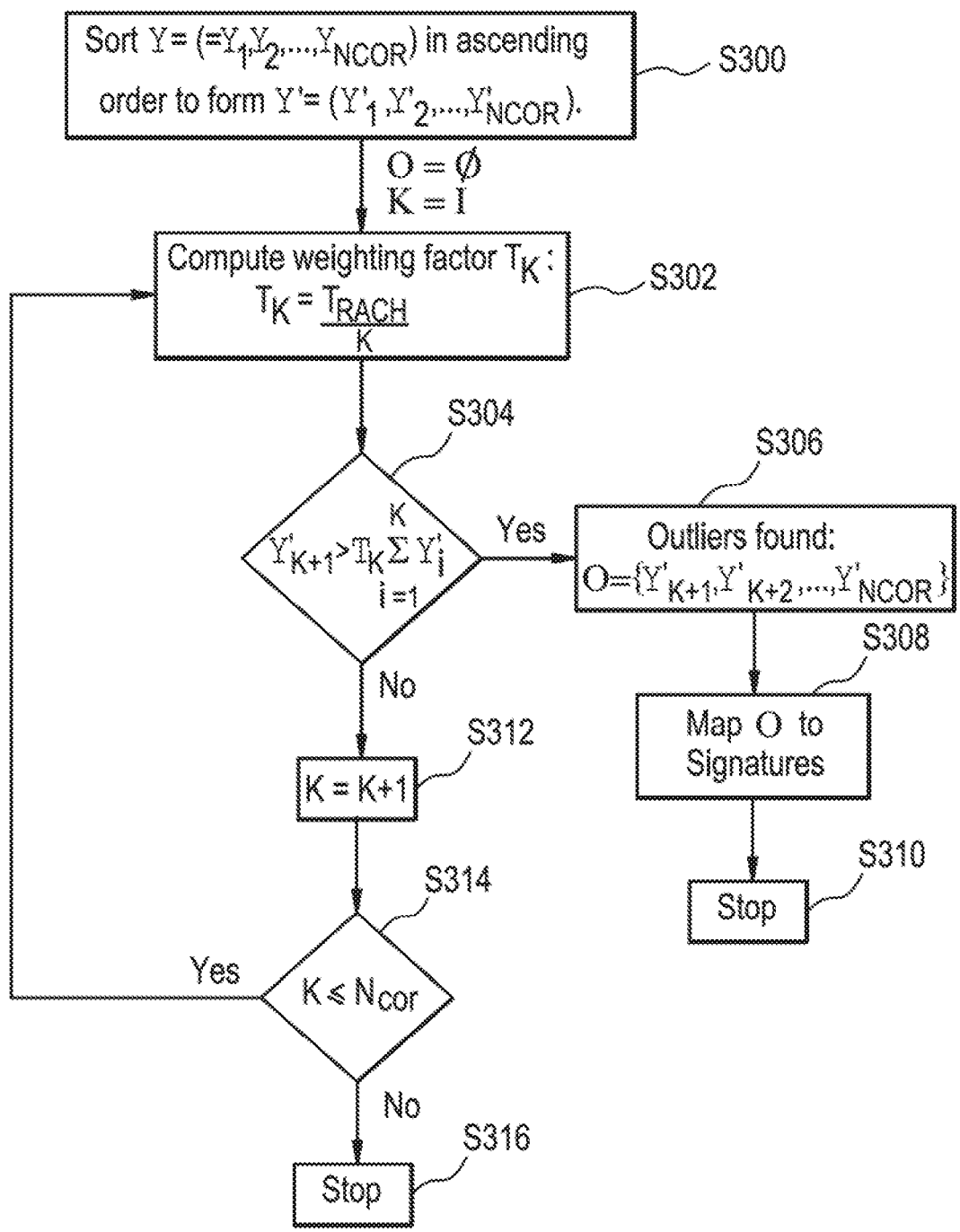
FIG. 6 illustrates a random access channel (RACH) signature detection method, in accordance with an example embodiment.

Algorithm 1—RACH Signature Detection Based on FCME:

FIG. 6 illustrates a random access channel (RACH) signature detection method, in accordance with an example embodiment. As shown in step S300, the processor 210 may cause the signature detection block 119 to sort the power profile values $Y_j$ in ascending order, i.e., $\{Y_1, Y_2, \ldots, Y_{N_{cor}}\} = \{Y'_1, Y'_2, \ldots, Y'_{N_{cor}}\}$ with $Y'_1 \le Y'_2 \le \ldots \le Y'_{N_{cor}}$, where $O = \emptyset$ and, stopFlag=0, and k=I, while (stopFlag=0) $\wedge (k \le N_{cor})$. In step S302, the processor 210 may then compute a weighting factor $T_k$ to be used with the values $\{Y'_1, Y'_2, \ldots, Y'_{N_{cor}}\}$, where the weighting factor may be defined as $T_k = T_{RACH}/k$.

In step S304, the processor 210 may determine if $Y'_{k+1} > T_k \sum_{i=1}^{k} Y'_i$. If this relationship holds true, then in step S306 the processor 210 may determine outliers $\{Y'_{k+1}, Y'_{k+2}, \ldots, Y'_{N_{cor}}\}$ corresponding to the transmitted signatures, such that $O = \{Y'_{k+1}, Y'_{k+2}, \ldots, Y'_{N_{cor}}\}$. Based on a determination of the outliers, in step S308 the processor 210 may then remap elements of $O$ to the original metric space (i.e., signature windows), whereupon the procedure may stop at step S310.

If in step S304 the processor 210 determines that the relationship $Y'_{k+1} > T_k \sum_{i=1}^{k} Y'_i$ does not hold true, then in step S312 the processor 210 may increment k (k=k+1) in step S312, whereupon the processor may determine if k is less than or equal to Ncor (in step S314), and if k is less than or equal to Ncor then the processor repeats step S302 (otherwise the procedure ends at step S316).

Figure 7:
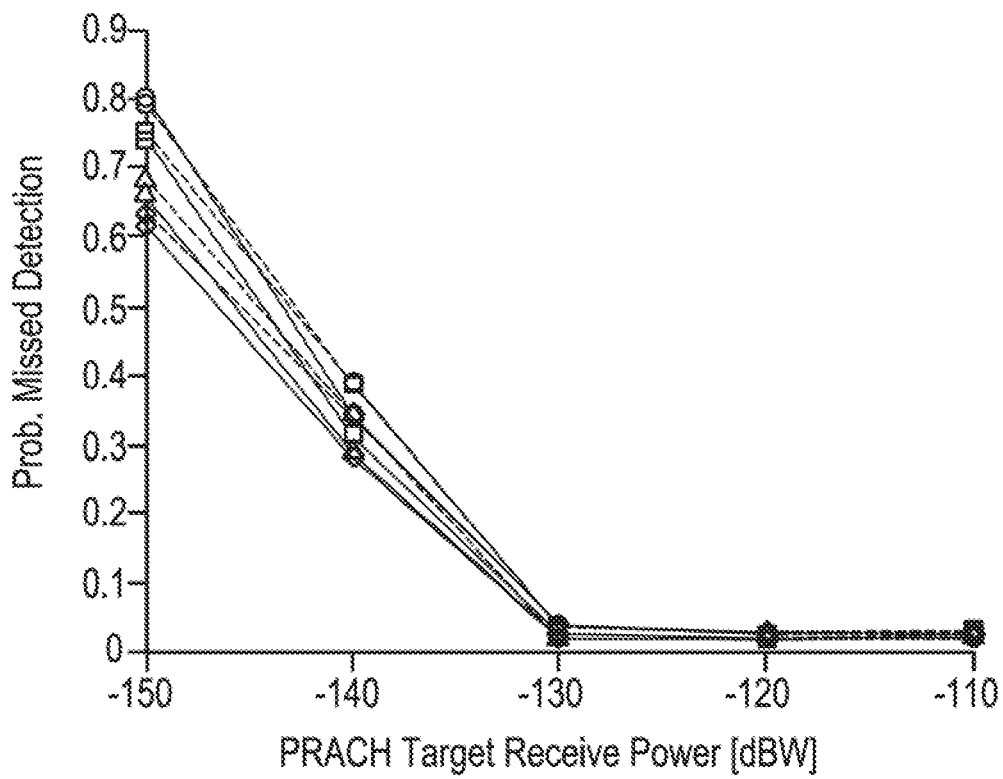
FIG. 7 illustrates a probability of a missed detection using the RACH signature detection, in accordance with an example embodiment.
Figure 8:
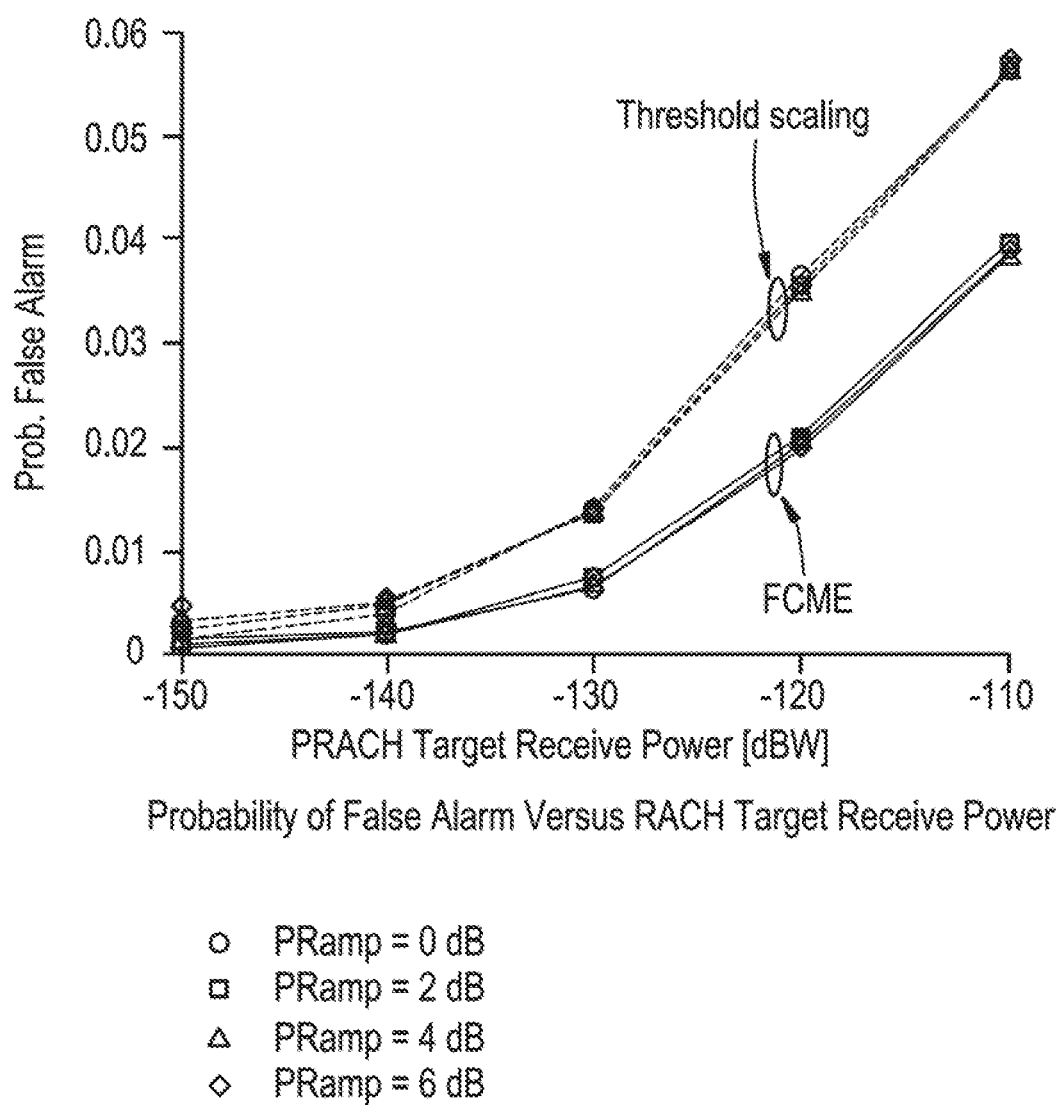
FIG. 8 illustrates a probability of a false alarm detection using the RACH signature detection, in accordance with an example embodiment.
Figure 9:
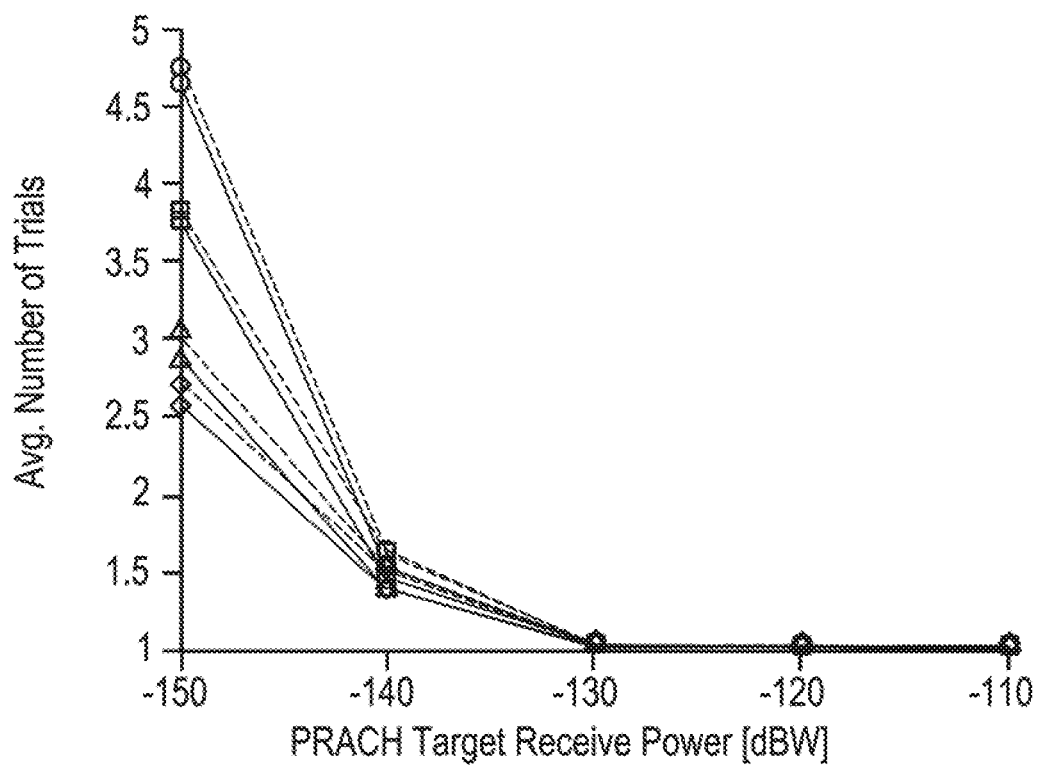
FIG. 9 illustrates an average number of trials using the RACH signature detection, in accordance with an example embodiment.

FIGS. 7-9 depict simulation results related to the performance of the method of FIG. 6. Specifically, FIG. 7 illustrates a probability of a missed detection for an overall network as a function of a target receive power that may be set for random access communications. As shown in this figured, forward consecutive mean excision (FCME) method of FIG. 6, and the threshold scaling (i.e., conventional method) show approximately a same performance with power ramp-ups (PRamp) having some minor impact only for lower target receive powers. FIG. 8 depicts a probability of a false alarm as a function of a target receive power level for a UE 110 transmitting a RACH preamble. As shown in FIG. 8, the method of FIG. 6 has clear advantages over the conventional threshold scaling. FIG. 9 depicts an average number of trials as a function of a target receive power level for a UE 110 transmitting a RACH preamble. As shown in FIG. 9, the FCME and threshold scaling show similar performance, although PRamp has some impact on a number of attempts for lower target receiver powers.

Optimization of RACH Initial Target Receive Power $P_{0,RACH}$ and Power Ramp-Up $P_{ramp,RACH}$:

Following an initial cell synchronization process, the UE 110 may decode useful information related to cell access. Specifically, the System Information Block 2 (SIB2, in step S900 of FIG. 26) may broadcast to all UEs 110, and this broadcast may carry information related to RACH parameters, which may include a RACH initial target receive power $P_{0,RACH}$ and a power ramp-up $P_{ramp,RACH}$. Upon decoding of the RACH parameters, the UEs 110 may adjust a transmit power of the RACH preambles $P_{RACH}$ as shown below.

$$P_{RACH}(k) = \min\{P_{max}, P_{0,RACH} - P_{loss} + (k-1) P_{ramp,RACH} + \Delta_{preamble}\},\quad \text{Equation 4}$$

Where $P_{max}$ may be a maximum power that can be transmitted by the UE 110, $P_{loss}$ may be a path-loss that is to be compensated for (estimated using downlink reference signals), k may be a number of attempts associated with the preamble detection by the eNB 105a, and $\Delta_{preamble}$ may be a power offset that may depend on a type of RACH preamble being transmitted.

As mentioned above, the power level defined by $P_{0,RACH}$ and $P_{ramp,RACH}$ may directly reflect the network metrics A)-C). In this context, the metrics A)-C) may be periodically monitored such that a proper adjustment of $P_{0,RACH}$ and $P_{ramp,RACH}$ may be made.

In the case of network metric A), $P_{0,RACH}$ and $P_{ramp,RACH}$ may impact network interference levels in two ways.

First, the Physical Random Access Channel (PRACH), which has a transmit power controlled by $P_{0,RACH}$ and $P_{ramp,RACH}$, and which transports the RACH preambles, may cause interference in data/control channels (PUSCH/PUCCH) of neighboring sectors.

Figure 26:
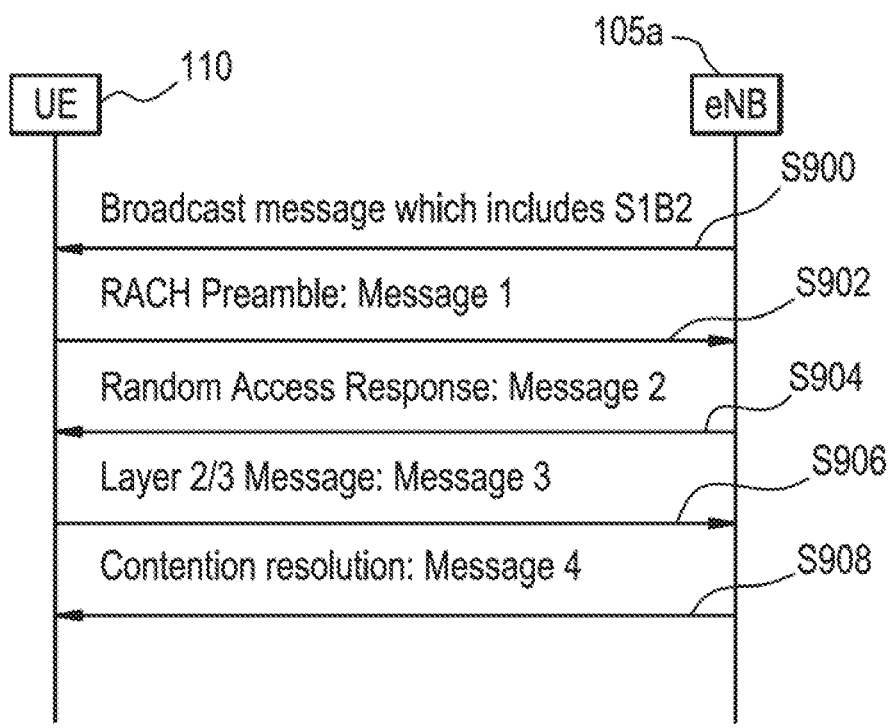
FIG. 26 illustrates a communication diagram with exchange of messages between a user equipment and an eNB for the RACH procedure, in accordance with an example embodiment.

Second, after the RACH preamble (Message 1 in step S902 of FIG. 26) from a particular UE 110 is detected, the eNB 105a may acknowledge (Message 2 in step S904 of FIG. 26). Then, the UE 110 may respond to the eNB 105a (Message 3 in step S906 of FIG. 26), which may usually be sent on the uplink data channel PUSCH, with power settings derived from a successfully detected Message 1. The portions of the PUSCH carrying Message 3 may cause interference in the data/control channels of neighboring sectors. The intensity of the Message 3 interference may then be a function of $P_{0,RACH}$ and the accumulation of power ramp-ups $P_{ramp,RACH}$.

In order to measure network metric A) such that $P_{0,RACH}$ and $P_{ramp,RACH}$ may be controlled, the eNB 105a measurements associated with a received interference power and a thermal noise power may be used, as shown below.

$$I_{v,t}^{msg1}(p) = \sum_{u \neq v} I_{u,v,t}^{msg1}(p) \quad \text{Equation 5}$$

Equation 5 describes an interference caused by the messages 1 (step S902 of FIG. 26) on the physical resource block p of sector v at time t. Note that $I_{v,t}^{msg1}(p)$ may be a sum of the terms $I_{u,v,t}^{msg1}(p)$ (i.e., an interference due to the message 1 originating from sector u on the physical resource block p of sector v at time t. Similarly, the interference caused by message 3 on the physical resource block p of sector v at time t is shown in Equation 6.

$$I_{v,t}^{msg3}(p) = \sum_{u \neq v} I_{u,v,t}^{msg3}(p) \quad \text{Equation 6}$$

A thermal noise on the physical resource block p of sector v at time t may be defined as $N_{v,t}(p)$. In the case of receiver diversity, all quantities describe above may represent a linear average of the measurements in each diversity branch.

Based on the quantities described above, a single parameter may be used to represent the network metric A). This parameter may be designated as a noise rise, $R_{v,t}(p)$, and may be defined as follows.

$$R_{v,t}(p) = \frac{I_{v,t}^{msg1}(p) + I_{v,t}^{msg3}(p) + N_{v,t}(p)}{N_{v,t}(p)} \quad \text{Equation 7}$$

Where this variable relates to the physical resource block p of sector v at a time t. Note that either the component $I_{u,v,t}^{msg1}(p)$ or the component $I_{u,v,t}^{msg3}(p)$ from a particular originating sector u, or none of these components, may be contributing to the noise floor $R_{v,t}(p)$. The contribution of each interference component may be dependent upon a relative alignment of the physical resource blocks across the multiple sectors of the network.

Figure 27:
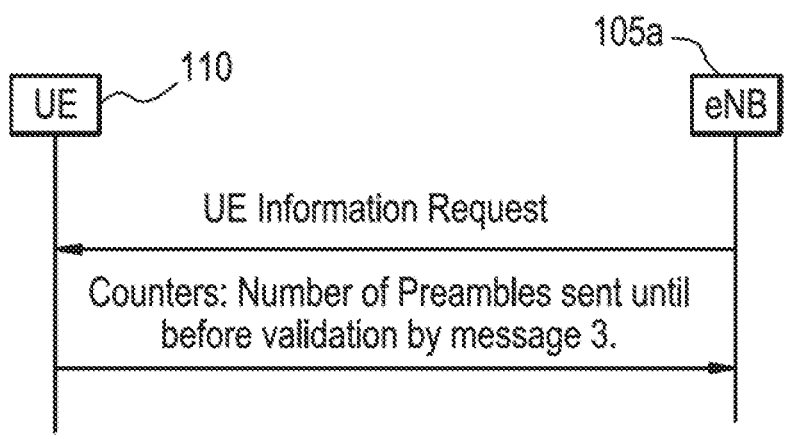
FIG. 27 illustrates another communication diagram with exchange of messages between a user equipment and an eNB for the RACH procedure, in accordance with an example embodiment.

In order to measure the network metrics B) and C), the preamble miss ratio for the l-th trial in sector v at time t, $M_{v,t}(l)$ may be quantified. $M_{v,t}(l)$ may be defined as follow.

$$M_{v,t}(l) = 1 - \frac{D_{v,t}(l)}{S_{v,t}(l)} \quad \text{Equation 8}$$

Where $D_{v,t}(l)$ may be a number of preambles validated with messages 3 during an l-th trial in sector v at time t, and $S_{v,t}(l)$ may be a total number of preambles sent for the l-th attempt in sector v at time t. In both counters $D_{v,t}(l)$ and $S_{v,t}(l)$, the preambles detected as a result of the contention resolution process may be excluded. Furthermore, from an implementation perspective, the counters $D_{v,t}(l)$ and $S_{v,t}(l)$ may be obtained from the information received as a response to the UEInformationRequest message sent by the eNB's 105a to a UE (see FIG. 27).

The values in Equations 7 and 8 may be defined for a certain instant of time t. However, for system optimization purposes, an averaging value of $R_{v,t}(p)$ and $M_{v,t}(t)$ over a period of time is useful. This is shown in the equations below.

$$R_{v,[kT]}(p) = \frac{1}{T} \sum_{t=(k-1)T}^{kT} R_{v,t}(p),$$ Equation 9

$$M_{v,[kT]}(l) = 1 - \frac{\sum_{t=(k-1)T}^{kT} D_{v,t}(l)}{\sum_{t=(k-1)T}^{kT} S_{v,t}(l)},$$ Equation 10

Where T may be defined as a sampling period during which measurements may be made.

Using quantities described in Equations 9 and 10, the RACH parameters $P_{0,RACH}$ and $P_{ramp,RACH}$ may be obtained from the multi-objective optimization program described below.

$$\arg\max_{P_{0,RACH}(k), P_{ramp,RACH}(k)} (f(R_{[kT]}), g(M_{[kT]}))$$ Equation 11 subject to:

$$R_{v,[kT]}(p) \leq R_{max}, \quad \forall v, t, p,$$

$$M_{v,[kT]}(l) \leq M_{max}(l), \quad \forall v, t,$$

Where $R_{[kT]} = (R_{[kT]}(1), R_{[kT]}(2), \ldots)$ with $R_{[kT]}(p) = (R_{1,[kT]}(p), R_{2,[kT]}(p), \ldots, R_{N_{sector},[kT]}(p))$, $M_{[kT]} = (M_{[kT]}(1), M_{[kT]}(2), \ldots)$ with $M_{[kT]}(l) = (M_{1,[kT]}(l), M_{2,[kT]}(l), \ldots, M_{N_{sector},[kT]}(l))$, $R_{max}$ may be a maximum tolerable noise rise, $M_{max}(l)$ may be a maximum tolerable preamble miss ratio at the l-th trial, and $N_{sector}$ may be a total number of sectors in the system that may be optimized. Although more sophisticated cost functions may be considered, in the most simple case the functions $f(\cdot)$ and $g(\cdot)$ describe an average of these variables $R_{v,[kT]}(p)$ and $M_{v,[kT]}(l)$ throughout the sectors v.

Figure 10:
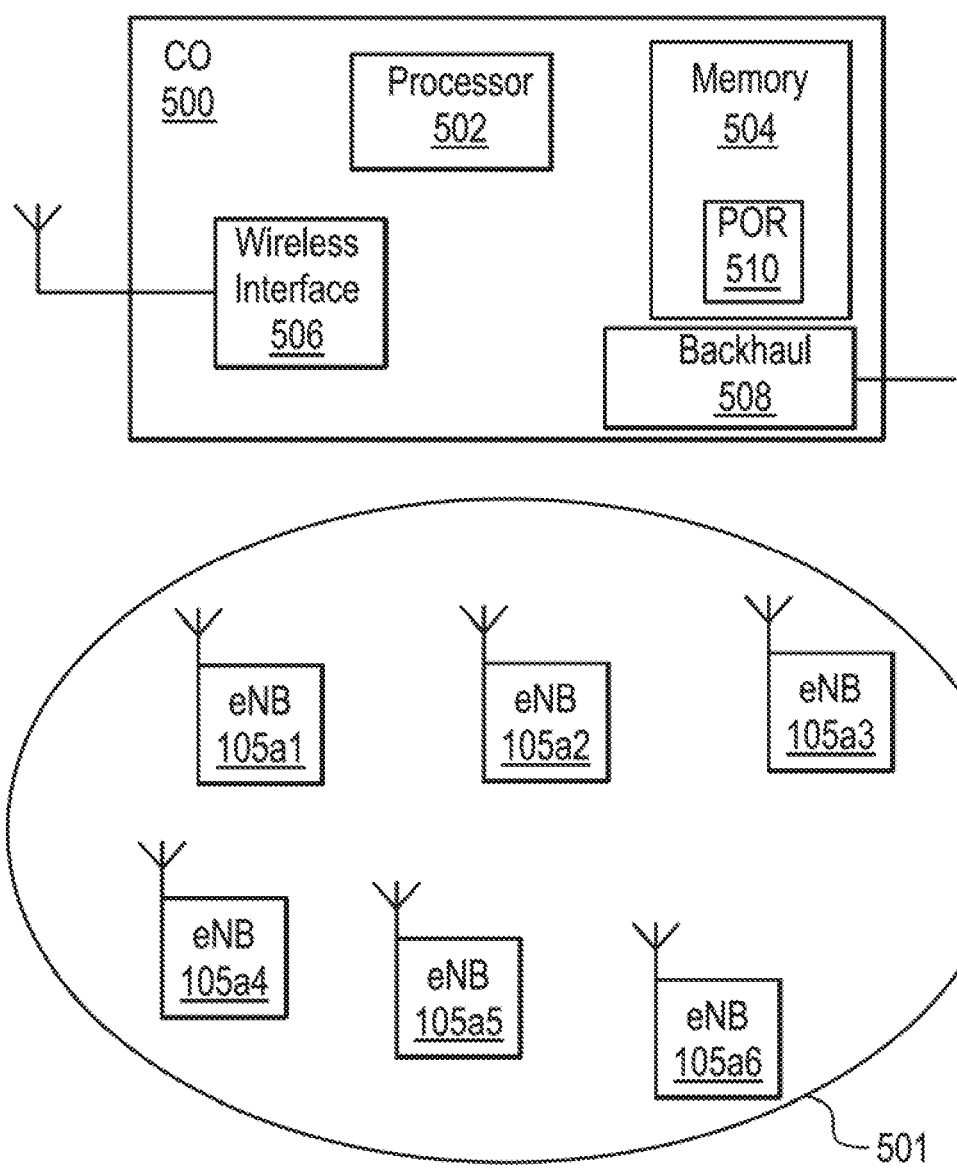
FIG. 10 illustrates a centralized LTE architecture, in accordance with an example embodiment.

Centralized Architecture (Algorithm 2):

FIG. 10 illustrates a centralized architecture involving a central office 500 (or, a central node) in communication with multiple eNBs (105a1-105a6, that are identical to eNB 105a of FIG. 4) in a geographic area 501. The central office 500 may include a processor 502, memory 504, a wireless interface 506 to communicate with each of the eNBs 105a, and a backhaul 508. A Power Optimization Routine (POR) 510 may be included in the memory. The processor 502 may cause the POR 510 to perform the method steps of the method flowchart shown in FIGS. 11A-11C, described below.

Referring to FIG. 10, the architecture may be used to control the RACH parameters (e.g., $P_{0,RACH}$ and $P_{ramp,RACH}$). To this end, the measurements such as $R_{v,k}(p)$ and $M_{v,k}(k)$ may be collected within the individual sectors v serviced by each respective eNB 105a. The measurements may then be sent via a network communication interface to the central office 500 to perform the optimization defined in Equation 11.

The multi-objective optimization program defined by Equation 11 may be solved using numerical methods such as an evolutionary algorithm which may use the concept of Pareto optimality. Alternatively, each element in the objective vector in Equation 11 may be optimized individually, but in coordination with each other. A specific method of implementing this latter method is shown in FIGS. 11A-11C.

Figure 12:
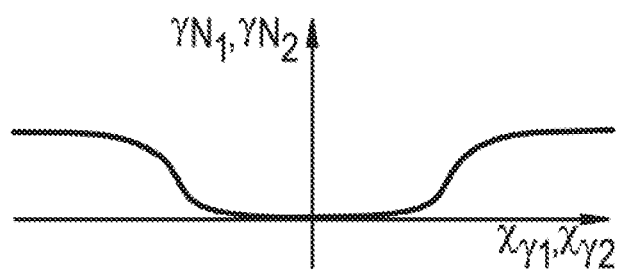
FIG. 12 illustrates a scaling function used in the method of optimizing power, in accordance with an example embodiment.

Algorithm 2—Optimizing Power:

In algorithm 2, a maximum tolerable value for the noise rise and preamble miss ratios (i.e., $R_{max}$, $M_{max,1}$ and $M_{max}$, respectively) may be set in agreement with each other because of an intertwined effect that variations in $P_{0,RACH}$ and $P_{ramp,RACH}$ may cause. In this context, the scaling constants, $\gamma_P$ and $\gamma_R$, and the scaling functions, $\gamma_{N_1}$ and $\gamma_{N_2}$, may be selected such that a speed of convergence and oscillations on network metrics may be kept in balance. Note that the scaling functions $\gamma_{N_1}$ and $\gamma_{N_2}$ may be designed to avoid "ping-pong" situations due to power updates driven by missed detection ratios and interference levels. The general shape for functions $\gamma_{N_1}$ and $\gamma_{N_2}$ are shown in FIG. 12. Moreover, the precision values $\epsilon_{M_1}$, $\epsilon_{M_2}$ and $\epsilon_R$ may also be configured to provide additional stability to the network metrics by avoiding unnecessary changes in RACH parameters. Finally, a function $Q\{\cdot\}$, which may be based on simulations, may be responsible for the mapping of continuous values into the discrete $P_{ramp,RACH}$ values supported by the network.

Figure 11A:
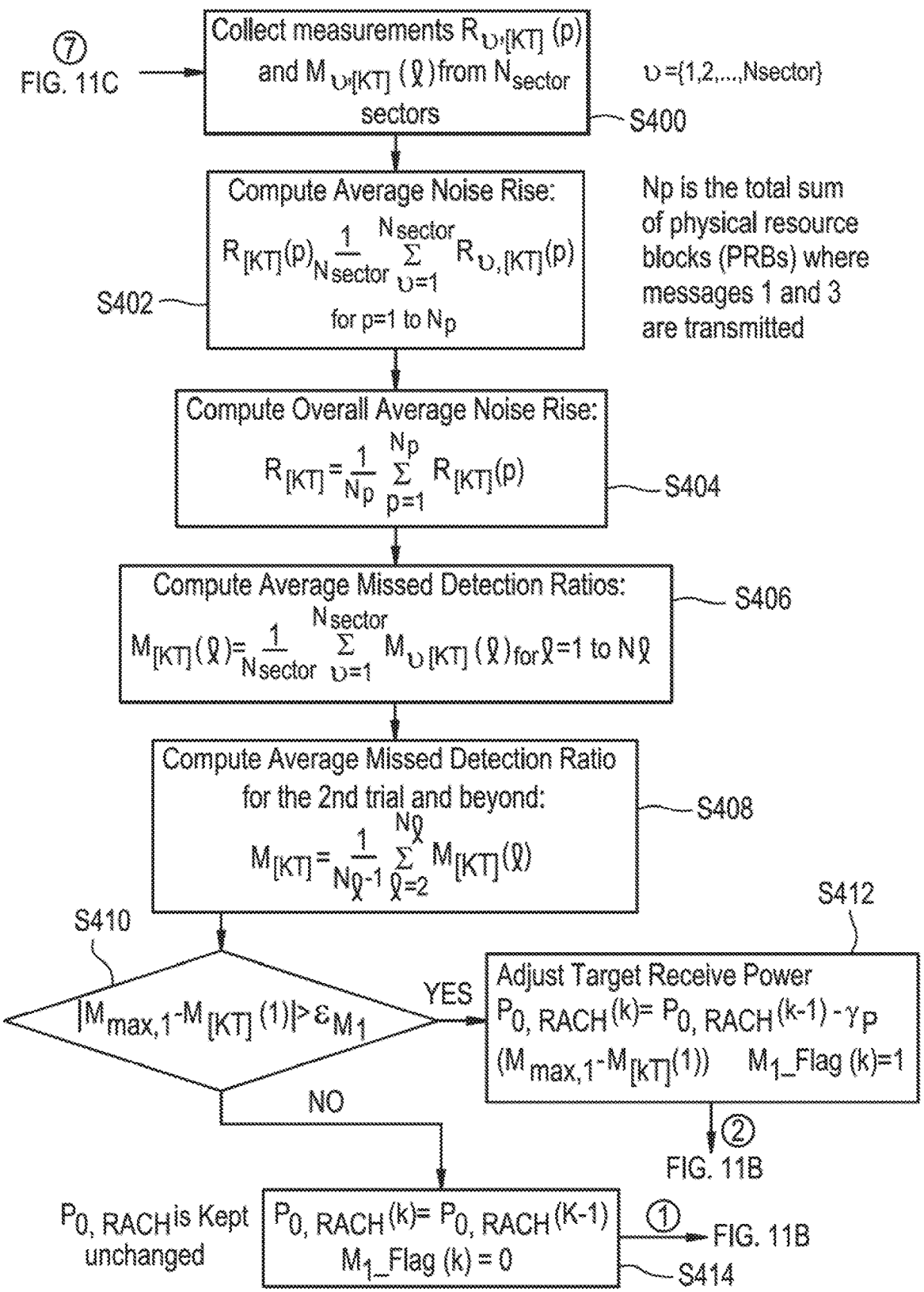
FIG. 11A illustrates a method optimizing power, in accordance with an example embodiment.
Figure 11B:
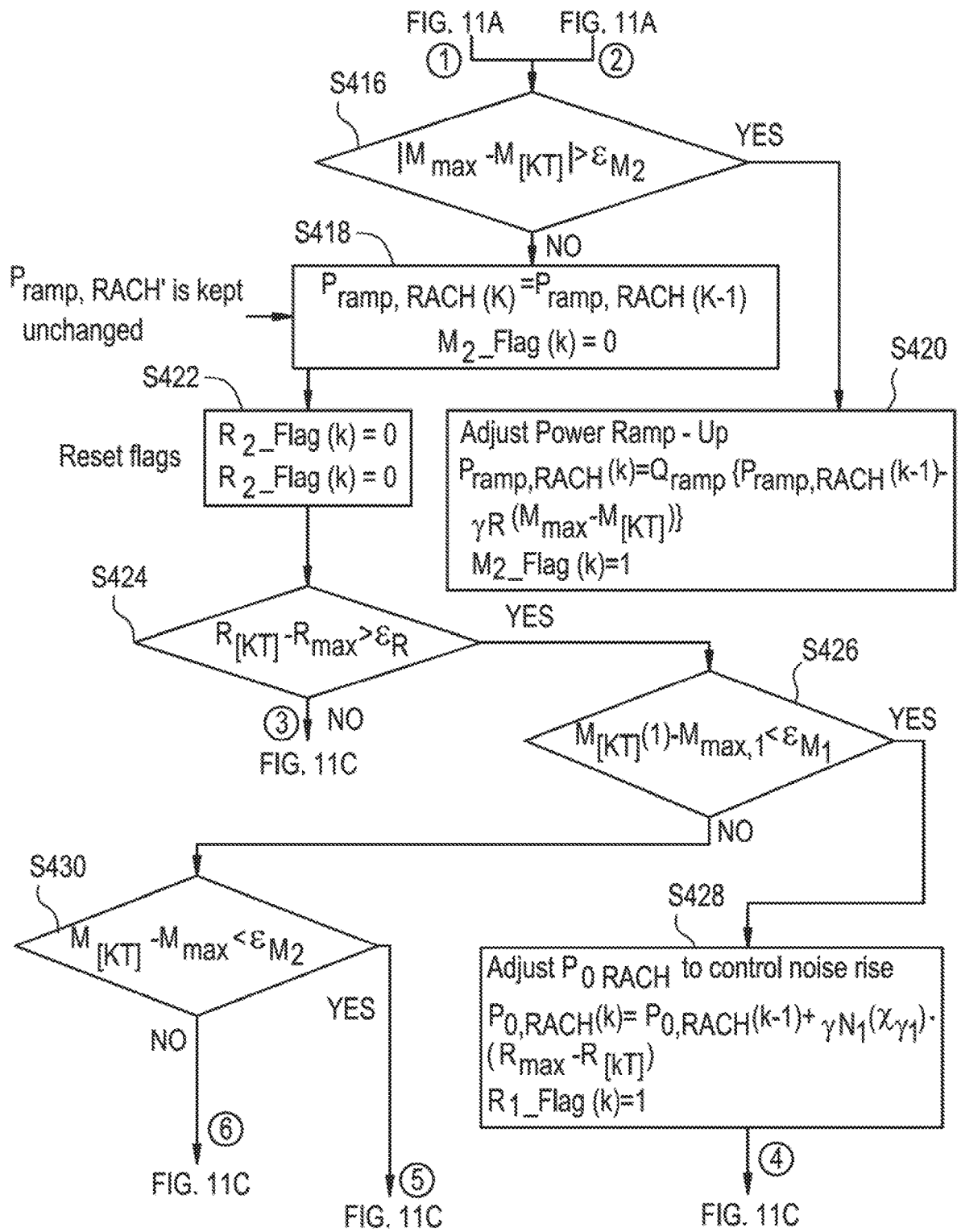
FIG. 11B illustrates a method optimizing power, in accordance with an example embodiment.
Figure 11C:
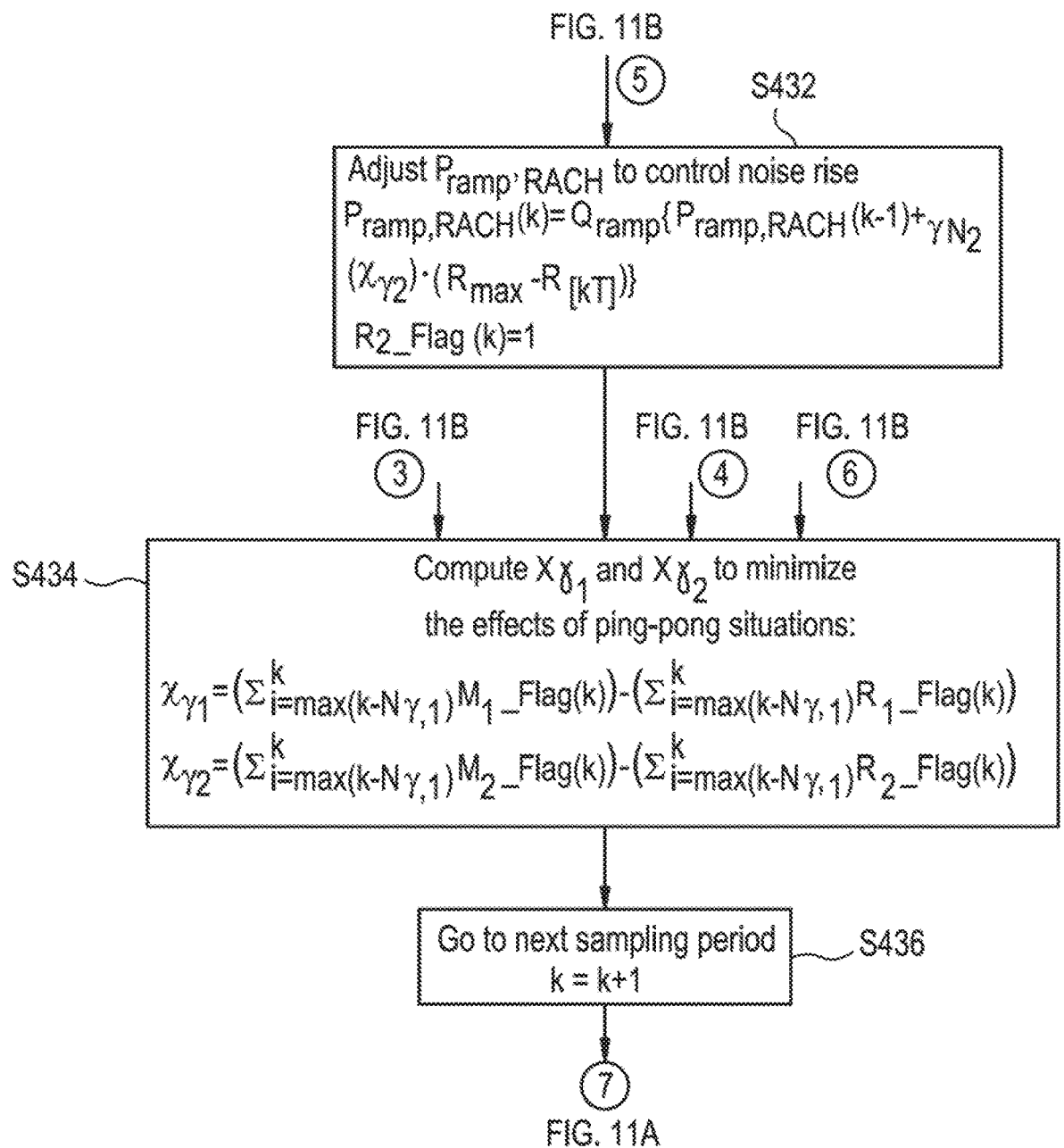
FIG. 11C illustrates a method optimizing power, in accordance with an example embodiment.

FIG. 11A depicts a flowchart of method steps involved in determining RACH power parameters using a centralized architecture (such as the architecture of FIG. 10), using the algorithm 2 approach. Specifically, in step S400, the processor 502 of the CO 500 may set k=1, and $x_{\gamma 1} = x_{\gamma 2} = N_\gamma$, in order to collect measurements $R_{v,[kT]}(p)$ and $M_{v,[kT]}(l)$ from the $N_{sector}$ sectors in the centralized system (FIG. 10), where this information collection comes from a collection of processors 210 of a number of base stations eNB (105a1-105a6, where each eNB may be identical to eNB 105a of FIG. 4). In step S402, the processor 502 may compute an average noise rise for the network, where a counter p may correspond to a physical resource block where Messages 1 and/or 3 (FIG. 26) may cause interference and $N_p$ may be a total number of such resource blocks, where P=1 to $N_p$ within the relationship $R_{[kT]}(p) = (1/N_{sector})\Sigma_{v=1}^{N_{sector}} R_{v,[kT]}(p)$.

In step S404, the processor 502 may compute an overall average noise rise for the network, as defined by $R_{[kT]} = (1/N_p)\Sigma_{p=1}^{N_p} R_{[kT]}(p)$. In step S406, the processor 502 may then Compute an average missed detection ratios for the network for l=1 to $N_l$ using the relationship $M_{[kT]}(l) = (1/N_{sector}) \Sigma_{v=1}^{N_{sector}} M_{v,[kT]}(l)$. In step S408, the processor 502 may compute an average missed detection ratio for the second trial (and further trials) using $M_{[kT]}(l) = (1/(N_l-1))\Sigma_{l=2}^{N_l} M_{[kT]}(l)$.

In step S410, the processor 502 may determine if the relationship if $|M_{max,1} - M_{[kT]}(1)| > \epsilon_{M_1}$ holds true, and if so then in step S412 the processor 502 may adjust target receiver power based on $P_{0,RACH}(k) = P_{0,RACH}(k-1) = \gamma_P (M_{max,1} - M_{[kT]}(1))$, where $M_1\_Flag(k)=1$.

If in step S410 the relationship $|M_{max,1} - M_{[kT]}(1)| > \epsilon_{M_1}$ does not hold true, then in step S414 the processor 502 may adjust the target receive power by $P_{0,RACH}(k) = P_{0,RACH}(k-1)$, where $M_1\_Flag(k)=0$.

Following steps S412 or S414, in step S416 (FIG. 11B) the processor 502 may determine if the relationship $|M_{max} - M_{[kT]}| > \epsilon_{M_2}$ holds true, and if so then in step S420 the processor 502 may adjust power ramp-up $P_{ramp,RACH}(k)$ by $P_{ramp,RACH}(k) = Q_{ramp}\{P_{ramp,RACH}(k-1) - \gamma_R(M_{max} = M_{[kT]})\}$, where $M_2\_Flag(k)=1$. Otherwise, the processor 502 may adjust the power according to $P_{ramp,RACH}(k) = P_{ramp,RACH}(k-1)$, where $M_2\_Flag(k)=0$ in step S418.

Following steps S420 or S422, the processor 502 may make adjustments in $P_{0,RACH}(k)$ or $P_{ramp,RACH}(k)$ to control the noise rise by adjusting $R_1\_Flag(k)=0$ and $R_2\_Flag(k)=0$.

In step S424, the processor 502 then determines whether the relationship $R_{[kT]} - R_{max} > \epsilon_R$ holds true, and if so the processor 502 then determines (in step S426) whether the relationship $M_{[kT]}(1) - M_{max,1} < \epsilon_{M_1}$ also holds true, and if so the processor 502 then adjusts the receive power to control a noise increase using $P_{0,RACH}(k)=P_{0,RACH}(k-1)+\gamma_{N_1}(x_{\gamma_1})\cdot(R_{max}-R_{[kT]})$, where $R_1\_Flag(k)=1$ in step S428. Otherwise, if the processor 502 determines the determination of step S426 to be negative, then in step S430 the processor then determines whether the relationship $M_{[kT]}-M_{max}<\epsilon_{M_2}$ holds true (where an affirmative response causes the processor 502 to perform the step of S432, and a negative response causes the processor 502 to perform the step of S434). If the processor 502 returns a negative response to the inquiry of step S424, then the processor 502 next performs the step of S434.

In step S432 (FIG. 11c), the processor 502 may adjust a receiver power to control a noise increase, by computing $P_{ramp,RACH}(k)=Q_{ramp}\{P_{ramp,RACH}(k-1)+\gamma_{N_2}(x_{\gamma_2})\cdot(R_{max}-R_{[kT]})\}$ where $R_2\_Flag(k)=1$. Then in step S434, the processor 210 may compute an intensity of "ping-pong" situations for the last $N_\gamma$ sampling periods by determining $x_{\gamma_1}=(\Sigma_{i=max(k-N_\gamma,1)}^k M_1\_Flag(k))-(\Sigma_{i=max(k-N_\gamma,1)}^k R_1\_Flag(k))$ and $x_{\gamma_2}=(\Sigma_{i=max(k-N_\gamma,1)}^k M_2\_Flag(k))-(\Sigma_{i=max(k-N_\gamma,1)}^k R_2\_Flag(k))$.

In step S436, the processor 502 may go to a next sampling period by incrementing k (k=k+1), and then returning to step S400 (FIG. 11A).

FIGS. 13-16 illustrates simulation results associated with determining power levels using the centralized architecture of FIG. 10. Specifically. FIGS. 13-16 show an impact of a control algorithm for the RACH target receive power, $P_{0,RACH}$, on the network metrics that are investigated. The simulation consists of a two-ring, 120-degree-sectored cellular network (i.e., 57 sectors) with wraparound, down-tilt, path-loss, shadow fading and uniform user distribution over the geographical area. The random accesses are assumed to be Poisson distributed with an intensity of 32 preambles/sector/second. The control algorithm for $P_{0,RACH}$ consist in the implementation of step S412 with $\gamma_P=20$, $M_{max,1}=0.1$ and T=0.1 seconds. Note that other values $\gamma_P$ and $M_{max,1}$ may be chosen to provide better system stability.

Figure 13:
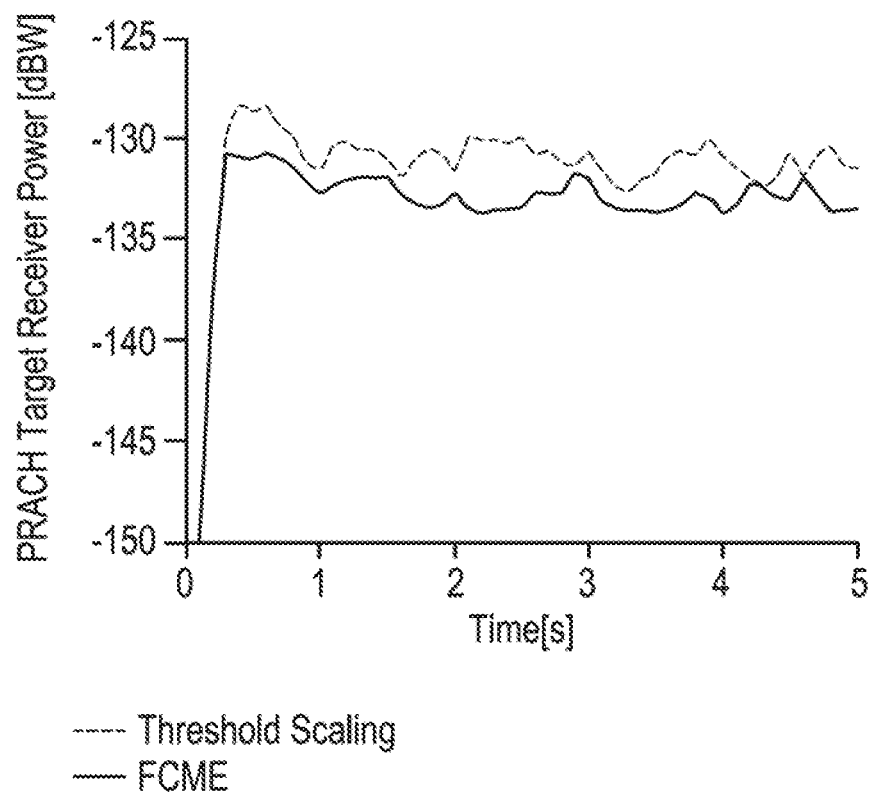
FIG. 13 illustrates an evolution of the PRACH target receiver power using the method of optimizing power, in accordance with an example embodiment.
Figure 14:
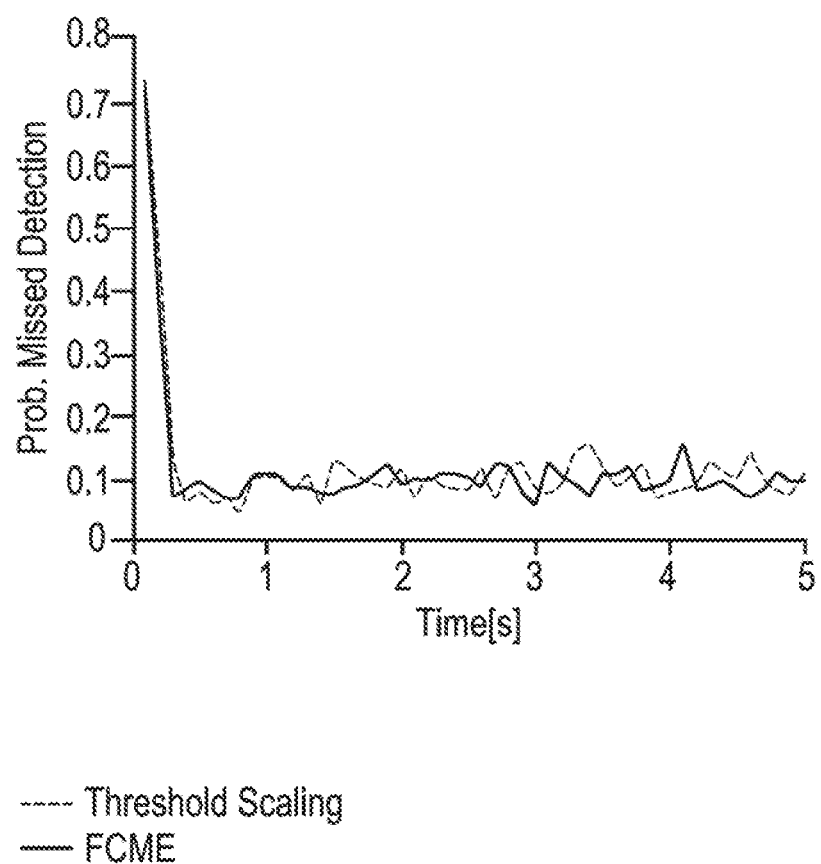
FIG. 14 illustrates an evolution of the probability of missed detection using the method of optimizing power, in accordance with an example embodiment.
Figure 15:
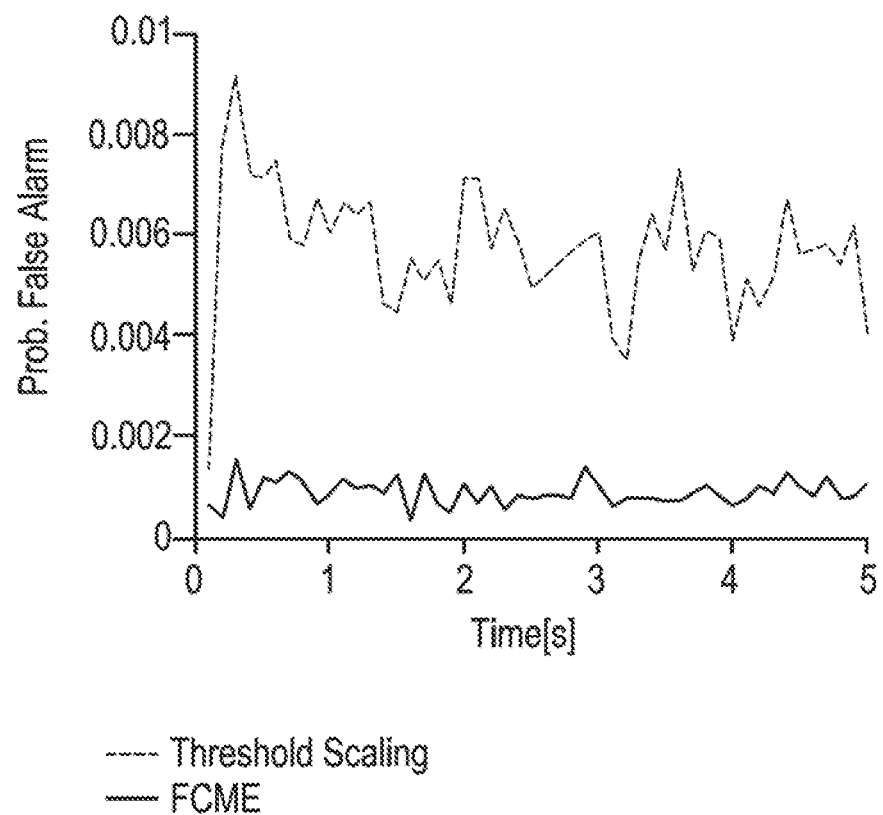
FIG. 15 illustrates an evolution of the probability of a false alarm using the method of optimizing power, in accordance with an example embodiment.
Figure 16:
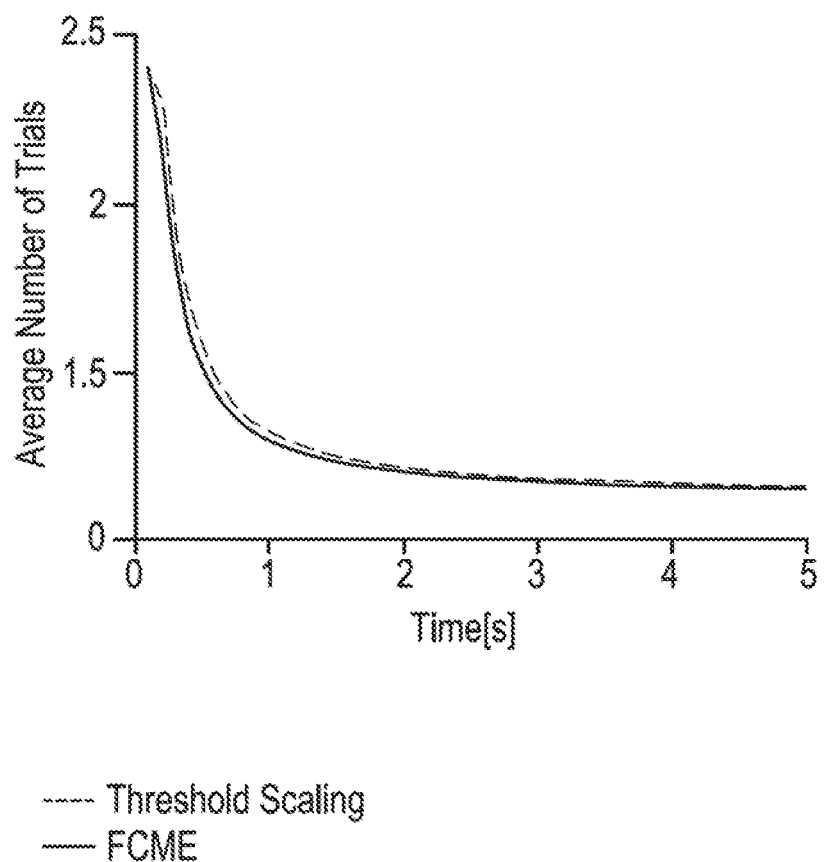
FIG. 16 illustrates an evolution of the average number of trials using the method of optimizing power, in accordance with an example embodiment.

FIG. 13 depicts an evolution of $P_{0,RACH}$ over a period of time, where the FCME method is shown to perform better than conventional threshold scaling. FIG. 14 depicts an evolution of the probability of a missed detection over a period of time. In this case, convergence is achieved for both signature detection methods at $M_{max,1}=0.1$. FIG. 15 depicts an evolution of the probability of a false alarm over a period of time. In this drawing, the FCME method provides advantages over a conventional threshold scaling method. FIG. 16 depicts an evolution of an average number of trials over time.

Optimization of the Normalized RACH Preamble Detection Threshold $T_{RACH}$ (Algorithm 3):

An optimization of $T_{RACH}$ may have a direct effect on network metrics C) and D) (i.e., minimization and delays and reduction of network signaling), respectively. As discussed above, the network metric C) may be measured in the eNBs 105a by computing a preamble miss ratio as defined in Equations 8 and 10. On the other hand, in order to measure network metric D), a new quantity called a 'preamble false alarm ratio' may be defined. For sector v at time t, preamble false alarm ratio $F_{v,t}$ may be defined as follows.

$$F_{v,t} = 1 - \frac{N_{v,t}^{msg3}}{N_{v,t}^{msg2}}, \qquad \text{Equation 12}$$

Where $N_{v,t}^{msg3}$ is a number of messages 3 (see FIG. 26) received in sector v at time t and $N_{v,t}^{msg2}$ is a number of messages 2 (see FIG. 26) sent by sector v at time t. Similar to the other quantities defined above, a time averaged $F_{v,t}$ may also be more convenient, and this value may be defined as shown below.

$$F_{v,[kT]} = 1 - \frac{\sum_{t=(k-1)T}^{kT} N_{v,t}^{msg3}}{\sum_{t=(k-1)T}^{kT} N_{v,t}^{msg2}}. \qquad \text{Equation 13}$$

An optimization of $T_{RACH}$ may also be defined by an optimization program similar to Equation 11. Equation 14 (below) offers such an optimization.

$$\arg\max_{T_{RACH}} f(F_{[kT]}) \qquad \text{Equation 14}$$

subject to:

$$F_{v,[kT]} \leq F_{max}, \quad \forall\, v,\, t,$$

Where $F_{[kT]}=(F_{1,[kT]}, F_{2,[kT]}, \ldots, F_{N_{sector},[kT]})$, $F_{max}$ may be a maximum tolerable false alarm rate, and $N_{sector}$ may be the total number of sectors in the system that may be optimized. Although more sophisticated cost functions may be considered, in the simplest case the function $f(\bullet)$ describes an average of the variable $F_{v,[kT]}$ throughout the sectors v.

Figure 17:
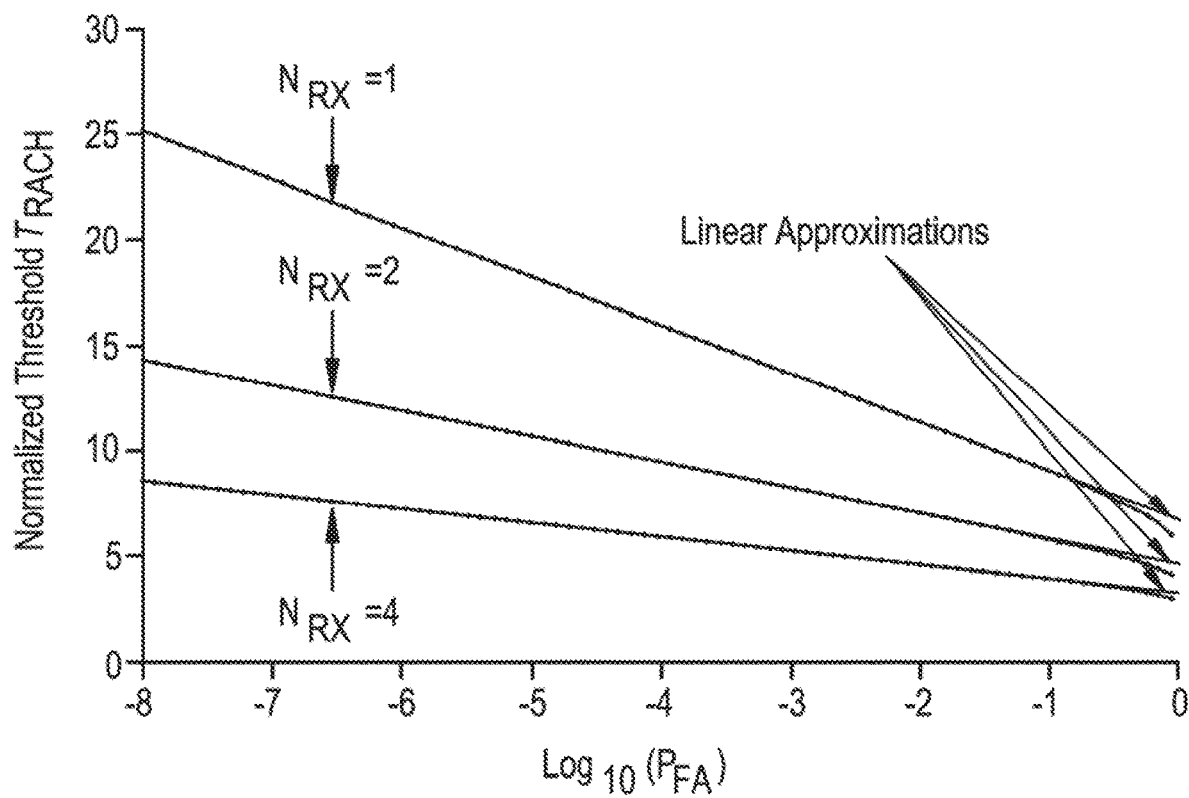
FIG. 17 illustrates a relationship between the normalized threshold and the logarithm probability of a false alarm, in accordance with an example embodiment.
Figure 18:
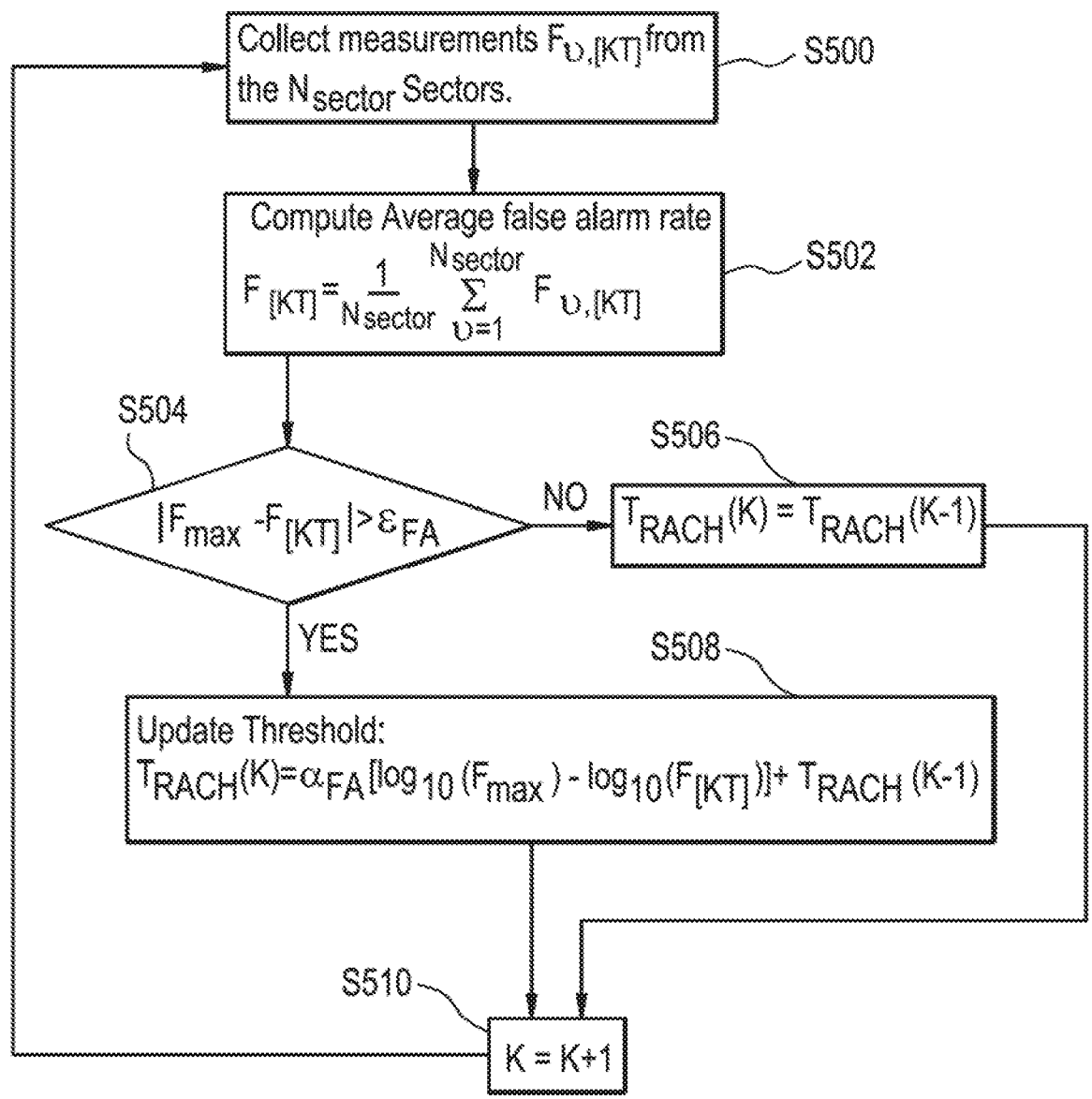
FIG. 18 illustrates a method for optimizing a threshold value, in accordance with an example embodiment.

In order to solve the problem defined by Equation 14, the system architecture depicted by FIG. 10 may be employed together with gradient based optimization methods. In this architecture, a central office (CO 500) may perform the method steps described below by running a power optimization routine (POR 510) saved to memory that includes the algorithms to perform the method steps. Alternatively, the dependency between $T_{RACH}$ and $P_{FA}$ as given in Equation 3 may be used to provide a simpler method to find an optimum value for $T_{RACH}$. In this context, FIG. 17 depicts a relationship between $T_{RACH}$ and $\log_{10}(P_{FA})$ for M=832 and $N_{RX}=\{1, 2, 4\}$ Relationships between $T_{RACH}$ and $\log_{10}(P_{FA})$ are approximately linear for a wide range of $P_{FA}$ values. The slopes $\alpha_{FA}$ for each $N_{RX}$ value are summarized in Table 2 (shown below).

TABLE 2

| $N_{RX}$ | 1 | 2 | 4 |
|---|---|---|---|
| $\alpha_{FA}$ | −2.31 | −1.22 | −0.66 |

Thus, using the slopes provided in Table 2, a new normalized threshold $\hat{T}_{RACH}$ from the current threshold $\tilde{T}_{RACH}$ may be computed such that a target probability of false alarm $P_{FA,target}$ may be achieved from a current probability of false alarm $\bar{P}_{FA}$. To this end, the following equation may define these relationships.

$$\hat{T}_{RACH} = \alpha_{FA}\cdot[\log_{10}(P_{FA,target}) - \log_{10}(\hat{P}_{FA})] + \tilde{T}_{RACH} \qquad \text{Equation 15}$$

Algorithm 3—Optimization of the Preamble Detection Threshold:

Optimization of the normalized RACH preamble detection threshold (described above) is reflected in the method shown in FIG. 18. As shown in step S500 of FIG. 18, the processor 502 of CO 500 may set k=1, and then the processor 502 may collect measurements $F_{v,[kT]}$ from a number of base stations (eNB 105a1-105a6) from geographic area 501 for further processing. It is important to note that in each eNB 105a of the area 501, a processor 210 for the respective eNB 105 may compute the measurement $F_{v,[kT]}$ based on Equations 12 and 13, where this information may be stored in memory 225 of the eNB 105a until the processor 500 requests this stored information. Then, in step S502, the processor 502 may compute an average false alarm rate for the network by determining $F_{[kT]}=(1/N_{sector})\Sigma_{v=1}^{N_{sector}}F_{v,[kT]}$.

In step S504, the processor 502 may determine whether the relationship $|F_{max}-F_{[kT]}|>\epsilon_{FA}$ holds true, and if so then in step S508 the processor 502 may update the threshold by $T_{RACH}(k)=\alpha_{FA}\cdot[\log_{10}(F_{max})-\log_{10}(F_{[kT]})]+T_{RACH}(k-1)$. Otherwise, the processor 502 may determine that $T_{RACH}(k)=T_{RACH}(k-1)$ in step S506. Following steps S506 or S508, the processor 502 may increment k (k=k+1) in step S510, and return to step S500 to repeat the algorithm 2 procedure.

Optimization of RACH Opportunity Period $\tau_{RACH}$ (Algorithm 4):

By controlling the RACH opportunity period $\tau_{RACH}$ (i.e., a frequency with which PRACH opportunity slots may be provided for random access communications), an optimization of network metric E) may be achieved. In this context, a measurement may be provided by the eNBs 105a that indicates a suitability of network metric E), where the measurement may be a 'contention ratio.' The contention ratio, $C_{v,t}$, for sector v at time t may be defined as follows.

$$C_{v,t} = 1 - \frac{A_{v,t}}{D_{v,t}} \quad \text{Equation 16}$$

Where $D_{v,t}$ may be an overall number of preambles detected in sector v at time t, and $A_{v,t}$ may be a total number of UEs 110 that were granted access to the network without the need for the 'contention resolution' procedure.

Similar to the other network measurements defined above, system optimization purposes dictate the use of a time averaging of $C_{v,t}$, as shown in the equation below.

$$C_{v,[kT]} = 1 - \frac{\sum_{t=(k-1)T}^{kT} A_{v,t}}{\sum_{t=(k-1)T}^{kT} D_{v,t}} \quad \text{Equation 17}$$

Where T may be defined as a sampling period during which measurements may be collected.

An optimization program may be defined to find a optimum value for $\tau_{RACH}$, as shown below.

$$\arg\max_{\tau_{RACH}} f(C_{[kT]}) \quad \text{Equation 18}$$

subject to:

$$C_{v,[kT]} \leq C_{max}, \quad \forall v, t,$$

Where $C_{[kT]}=(C_{1,[kT]}, C_{2,[kT]}, \ldots, C_{N_{sector},[kT]})$, $C_{max}$ may be a maximum tolerable contention ratio, $N_{sector}$ may be a total number of sectors in the system that may be optimized, and $f(\cdot)$ may describe an average of the variable $C_{v,[kT]}$ throughout the sectors v.

Similar to the normalized threshold $T_{RACH}$, a simpler means of solving the problem in Equation 18 may be implemented, where it is assumed that an exponential distribution with parameter $\lambda$ for inter-arrival time exists between each pair of consecutive RACH preamble transmissions. The number of RACH preamble transmissions, k, in any given time span, $\tau$, may be distributed according to a Poisson distribution, as shown below.

$$P\{k\} = \frac{e^{-\lambda\tau}(\lambda\tau)^k}{k!} \quad \text{Equation 19}$$

From Equation 19, a collision probability, $p_{col}$, as seen by a particular UE 110 during a time span $\tau$ may be written as follows.

$$p_{col} = \sum_{k=1}^{\infty} \frac{e^{-\lambda\tau}(\lambda\tau)^k}{k!} = e^{-\lambda\tau}(e^{-\lambda\tau}-1) = 1-e^{-\lambda\tau} \quad \text{Equation 20}$$

Thus, for a particular $p_{col}$ and a time span $\tau$, a supported intensity $\lambda$ may be determined as follows.

$$\lambda = -\frac{\log(1-p_{col})}{\tau} \quad \text{Equation 21}$$

Because there are $N_{preamble}$ orthogonal preambles available in each sector, for a particular $p_{col}$ and a particular RACH opportunity period $\tau_{RACH}$, a supported RACH intensity $\lambda_{RACH}$ may be determined as follows.

$$\lambda_{RACH} = -N_{preamble} \cdot \frac{\log(1-p_{col})}{\tau_{RACH}} \quad \text{Equation 22}$$

Figure 19:
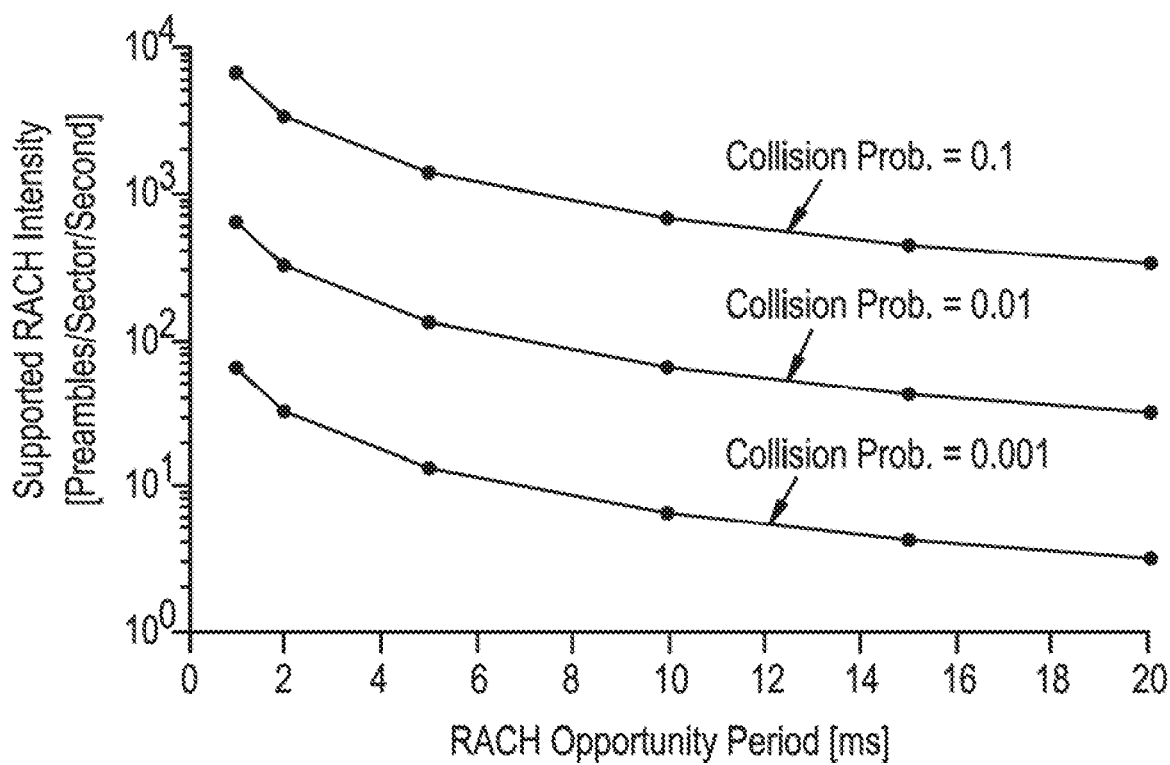
FIG. 19 illustrates a relationship between RACH intensity and RACH opportunity period, in accordance with an example embodiment.
Figure 20:
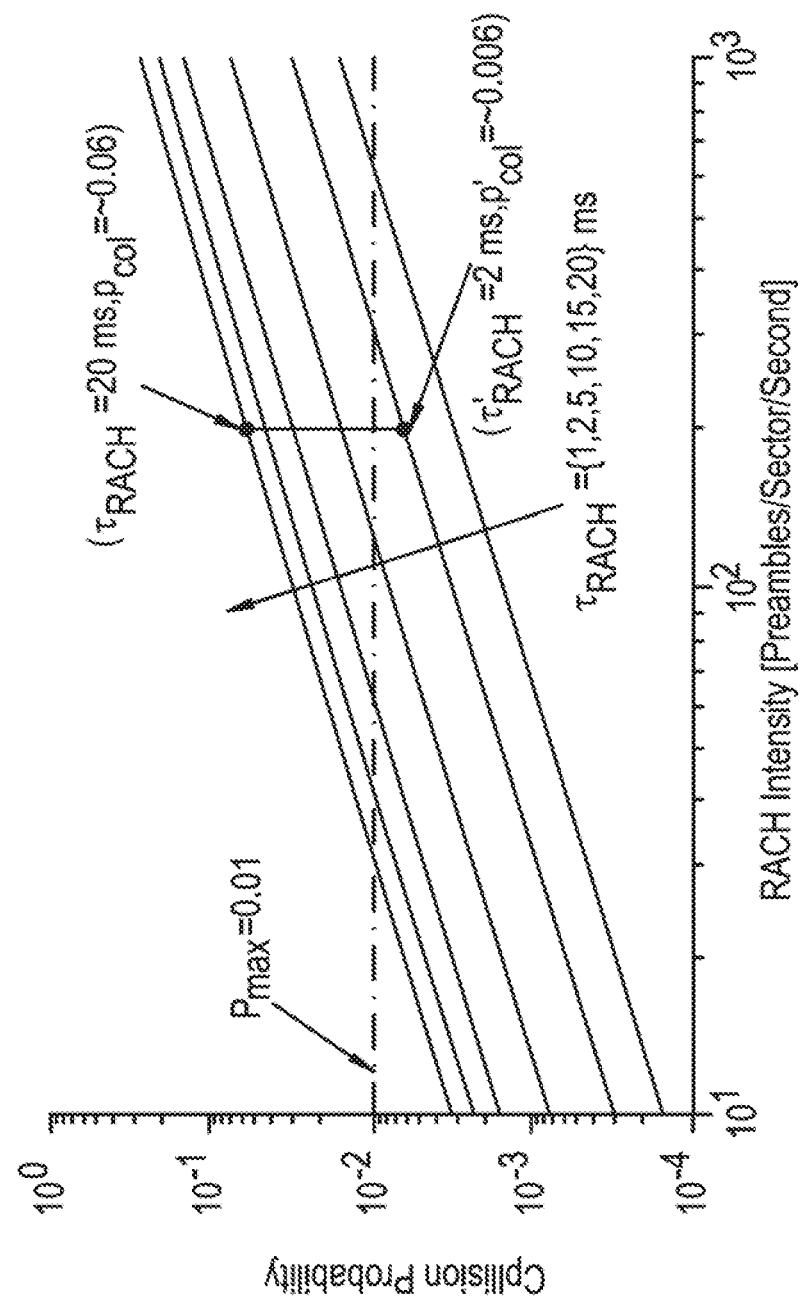
FIG. 20 illustrates relationships between RACH preamble collision probabilities and RACH intensities for different RACH opportunity periods $T_{RACH}$, in accordance with an example embodiment.

Algorithm 4—Optimizing Periodity:

FIG. 19 depicts a supported RACH intensity as a function of a RACH opportunity period (for 64 preambles per sector), where RACH intensities $\lambda_{RACH}$ varies with RACH opportunity periods $\tau_{RACH}$ for $N_{preamble}=64$ and $p_{col}=\{0.001, 0.01, 0.1\}$. FIG. 20 depicts collision probabilities $p_{col}$ as a function of RACH intensities $\lambda_{RACH}$ for $N_{preamble}=64$ and $\tau_{RACH}=\{1, 2, 5, 10, 15, 20\}$ ms. Based on FIG. 20, a look-up table may be constructed that maps each pair ($\tau'_{RACH}$, $p'_{col}$), with $p'_{col} \leq p_{max}$ and $\tau'_{RACH}$ greater than a maximum tolerable probability $p_{max}$, to a new pair ($\tau'_{RACH}$, $p'_{col}$), where $p'_{col} \leq p_{max}$ and $\tau'_{RACH}$ may be a largest possible RACH opportunity period. A mapping example for ($\tau_{RACH}=20$ ms, $p_{col}=\sim0.06$) to ($\tau'_{RACH}=2$ ms, $p'_{col}=\sim0.006$) is also depicted in FIG. 20 for $\lambda_{RACH}=200$ preambles/sector/second.

Figure 21:
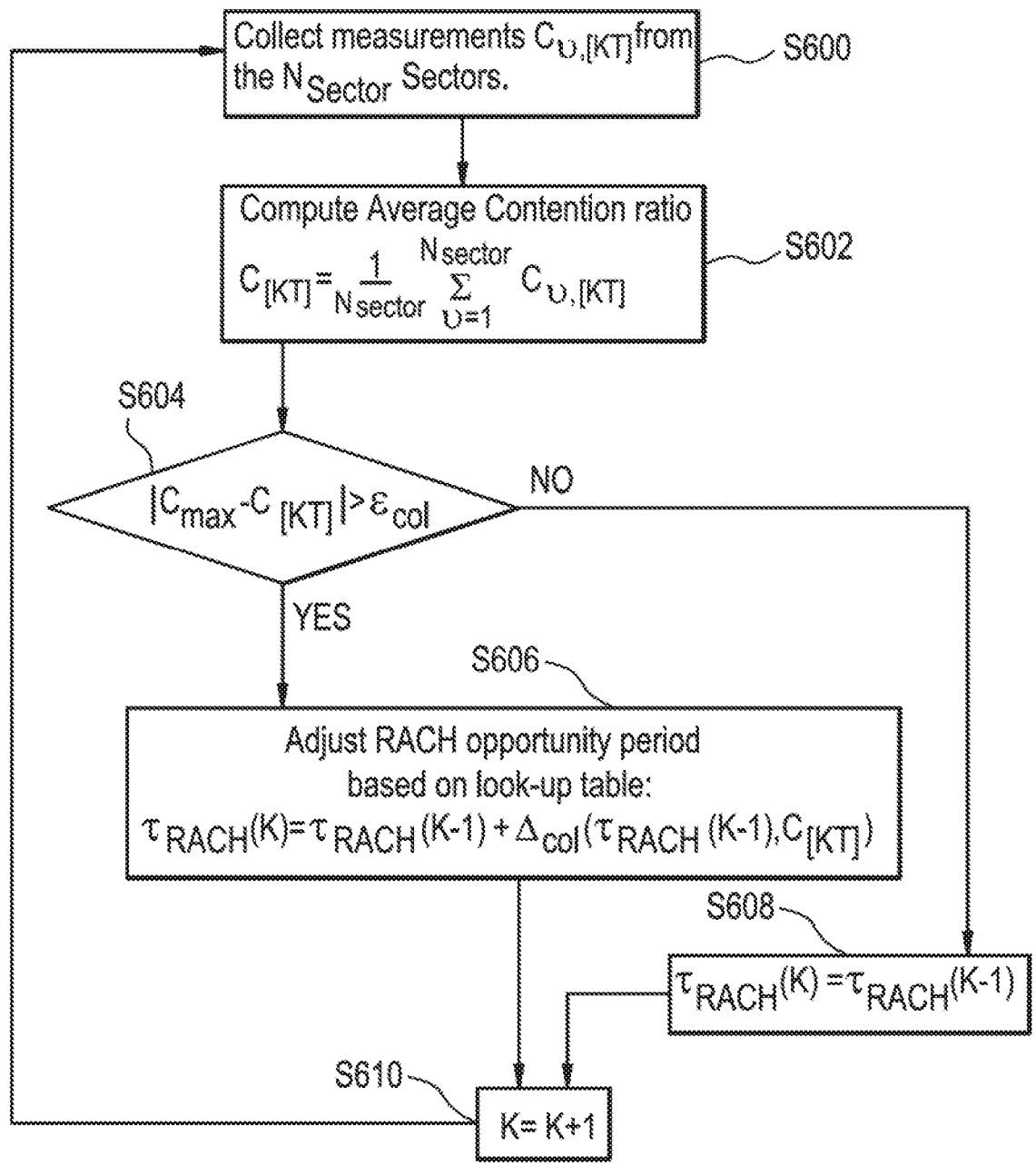
FIG. 21 illustrates a method of optimizing a periodicity, in accordance with an example embodiment.

FIG. 21 is a method flowchart providing a method for optimizing $\tau_{RACH}$, where the look-up table $\Delta_{col}$ may be constructed using the procedure indicated in FIG. 20. In step S600, the processor 502 may cause k=1, and then the processor 502 of CO 500 may collect measurements $C_{v,[kT]}$ from the eNBs 105a in geographic area 501 for further processing. Specifically, in each eNB 105a, the processor 210 may compute $C_{[kT]}=(1/N_{sector})\Sigma_{v=1}^{N_{sector}}C_{v,[kT]}$ based on Equations 16 and 17, where this information may then be stored in memory 225 until the processor 502 requests this information. Then, in step S602, the processor 502 may compute an average contention ratio for the network by calculating $C_{[kT]}=(1/N_{sector})\Sigma_{v=1}^{N_{sector}}C_{v,[kT]}$.

In step S604, the processor 502 may then determine is the relationship $|C_{max}-C_{[kT]}|>\epsilon_{col}$ holds true, and if so the processor 502 then may adjust the RACH opportunity period based on the look-up table, where $\tau_{RACH}(k)=\tau_{RACH}(k-1)+\Delta_{col}(\tau_{RACH}(k-1), C_{[kT]})$ in step S606. Otherwise, the processor 502 may determine that $\tau_{RACH}(k)=\tau_{RACH}(k-1)$, in step S608. Following steps S606 or S608, the processor may increment k (k=k+1), in step S610, and then return the process to step S600.

Comprehensive RACH Optimization Program (Algorithm 5):

The prior example embodiments (described above) considered an optimization of individual RACH parameters as stand-alone processes. However, in reality, there are interactions among the RACH parameters. For example, changing a normalized threshold $T_{RACH}$ may affect not only a preamble false alarm ratio but also a preamble miss ratio, which in turn may require a RACH target receive power $P_{0,RACH}$ to be adjusted. Due to the dependencies between the RACH parameters, FIG. 22 is a flowchart depicting a method of comprehensively optimizing multiple RACH parameters.

Figure 22:
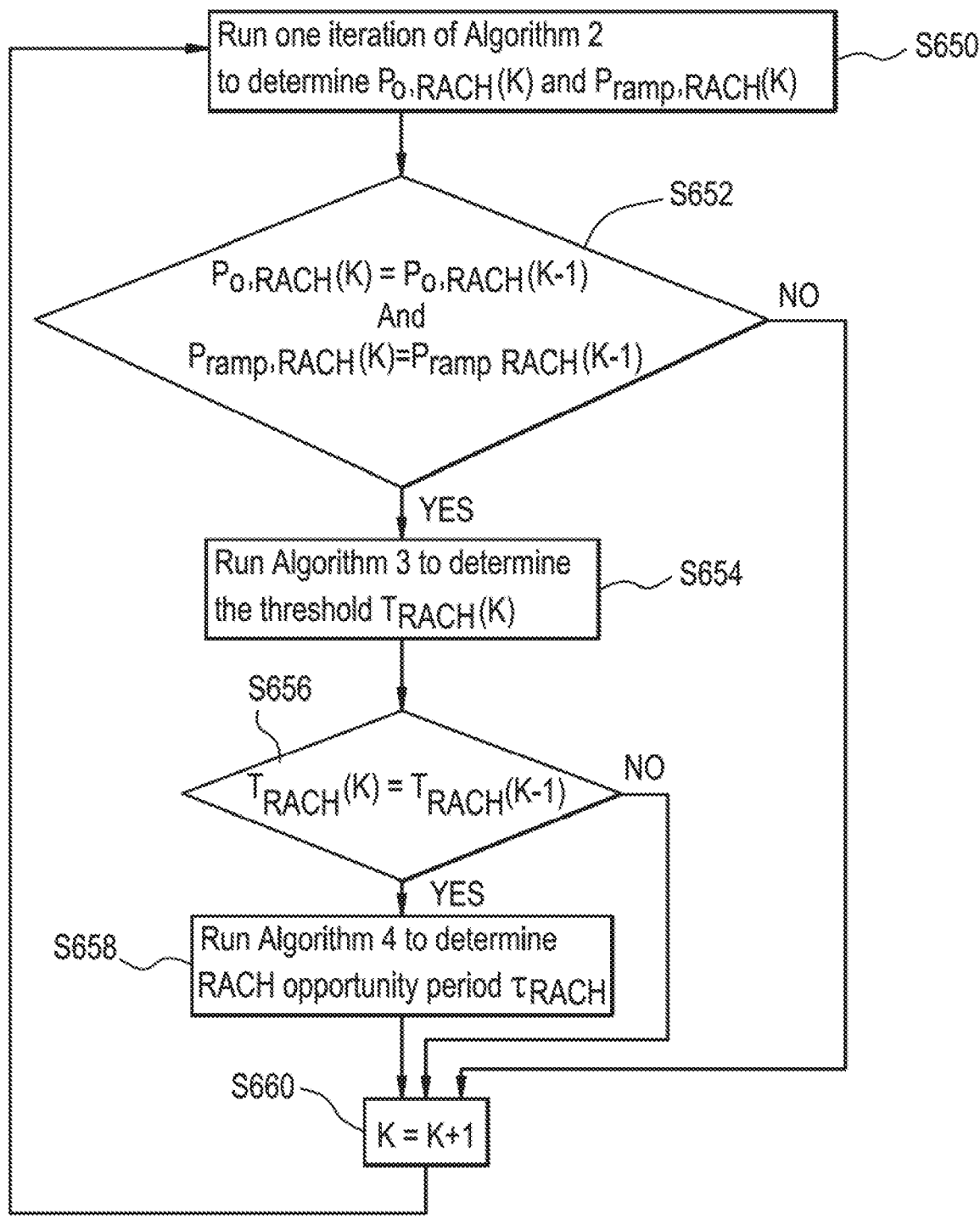
FIG. 22 illustrates a comprehensive RACH parameter optimization, in accordance with an example embodiment.

As depicted in FIG. 22, a method of comprehensive RACH optimization is provided. Specifically, in step S650 the processor 502 may set k=1, and then run an iteration of algorithm 2 (see FIGS. 11A-11C) to determine $[P_{0,RACH}(k), P_{ramp,RACH}(k)]=\text{Algorithm-2}(P_{0,RACH}(k-1), P_{ramp,RACH}(k-1), R_{max}, M_{max,1}, M_{max}, \gamma_P, \gamma_R, \gamma_{N_1}, \epsilon_{M_1}, \epsilon_{M_2}, \epsilon_R)$. Then, in step S652, the processor 502 may determine if the relationship $(P_{0,RACH}(k)=P_{0,RACH}(k-1))\wedge(P_{ramp,RACH}(k)=P_{ramp,RACH}(k-1))$ holds true, and if so then in step S654 the processor 502 may run algorithm 3 (FIG. 18) to determine $T_{RACH}(k)$, where $T_{RACH}(k)=\text{Algorithm\_3}(T_{RACH}(k-1), F_{max}, \alpha_{F4}, \epsilon_{F4})$. Otherwise, the method may progresses to step S660, where the processor 502 increments (K=K+1), and return to step S650.

Following step S654, in step S656 the processor 502 may determine if $T_{RACH}(k)=T_{RACH}(k-1)$, and if so then in step S658 the processor 502 may run algorithm 4 (FIG. 21) to determine $\tau_{RACH}(k)=\text{Algorithm\_4}(\tau_{RACH}(k-1), C_{max}, \Delta_{col}, \epsilon_{col})$. If the processor 502 determines that the inquiry of step S656 is negative, or if the processor 502 competes step S658, then the processor 502 increments k (k=k+1) in step S660, and returns the process to step S650.

Figure 23:
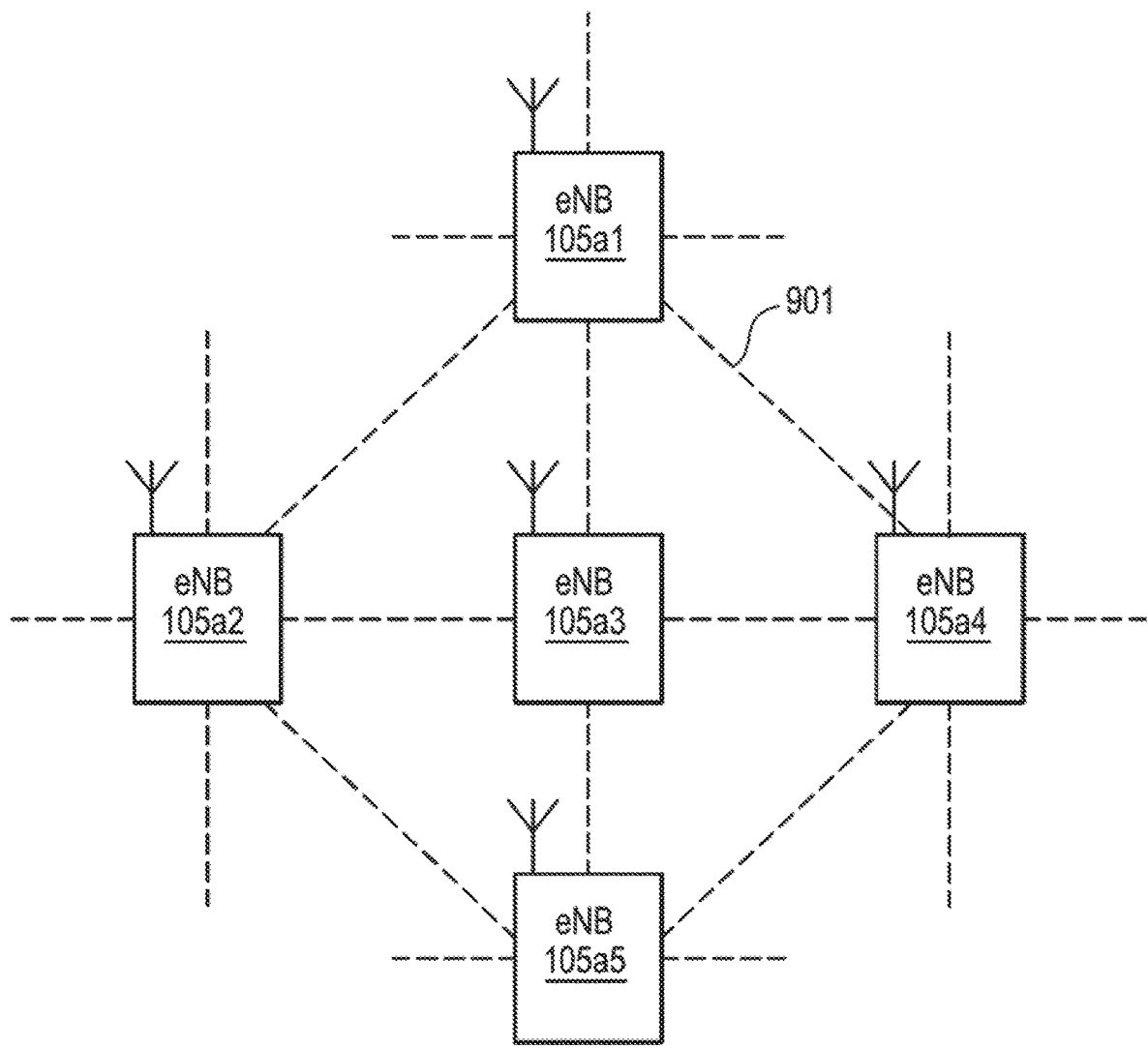
FIG. 23 illustrates a decentralized LTE architecture, in accordance with an example embodiment.

Decentralized RACH Optimization Procedures (Algorithm 6):

The example embodiments associated with FIG. 10 (a centralized hierarchy) pertain to a hierarchy reliant on a central office 500 that is able to collect measurements from eNBs 105a within a particular geographical area 501, where measurements are processed so that the eNBs 105a are updated with newly computed RACH parameters. However, such a centralized solution assumes that (1) communication interfaces are available for carrying information between the central office 500 and the eNBs 105a, (2) the deployment is homogeneous (i.e., all eNBs 105a provide a same coverage characteristics), and (3) the traffic is homogeneous in the geographical area 501 being considered. In the case that these conditions are not met, a decentralized solution may perform better. FIG. 23 therefore depicts a decentralized hierarchy, where each eNB 105a has a same structure as shown in FIG. 4, and interference measurements 901 are transmitted between neighboring eNBs 105a via wireless interface 235.

Because changes in the RACH preamble detection threshold $T_{RACH}$ and opportunity period $\tau_{RACH}$ have a low impact on a performance of neighboring sectors, an optimization may be carried out independently in each sector (i.e., in a decentralized fashion). In this scenario, the only required changes to the methods of FIGS. 18 and 21 relate to setting $N_{sector}=1$, where the optimizations are performed locally and independently, on a sector-by-sector basis.

However, because variations in $P_{0,RACH}$ and $P_{ramp,RACH}$ affect interference levels in neighboring sectors, a small amount of coordination between the sectors may improve performance. Specifically, neighboring sectors may be able to exchange information about the interference levels that are experienced due to changes in $P_{0,RACH}$ and $P_{ramp,RACH}$. This exchange of interference information between eNBs 105a may be done using the quantities $R_{v,[kT]}(p)$ as defined in Equation 9. Therefore, FIGS. 24A-24C provides a method implementing a decentralized solution for the optimization of $P_{0,RACH}$ and $P_{ramp,RACH}$ where any of the processors 210 of the eNB 105a1-105a5 may perform the method steps (and, each of eNB 105a1-105a5 are identical to the eNB 105a of FIG. 4).

Figure 24A:
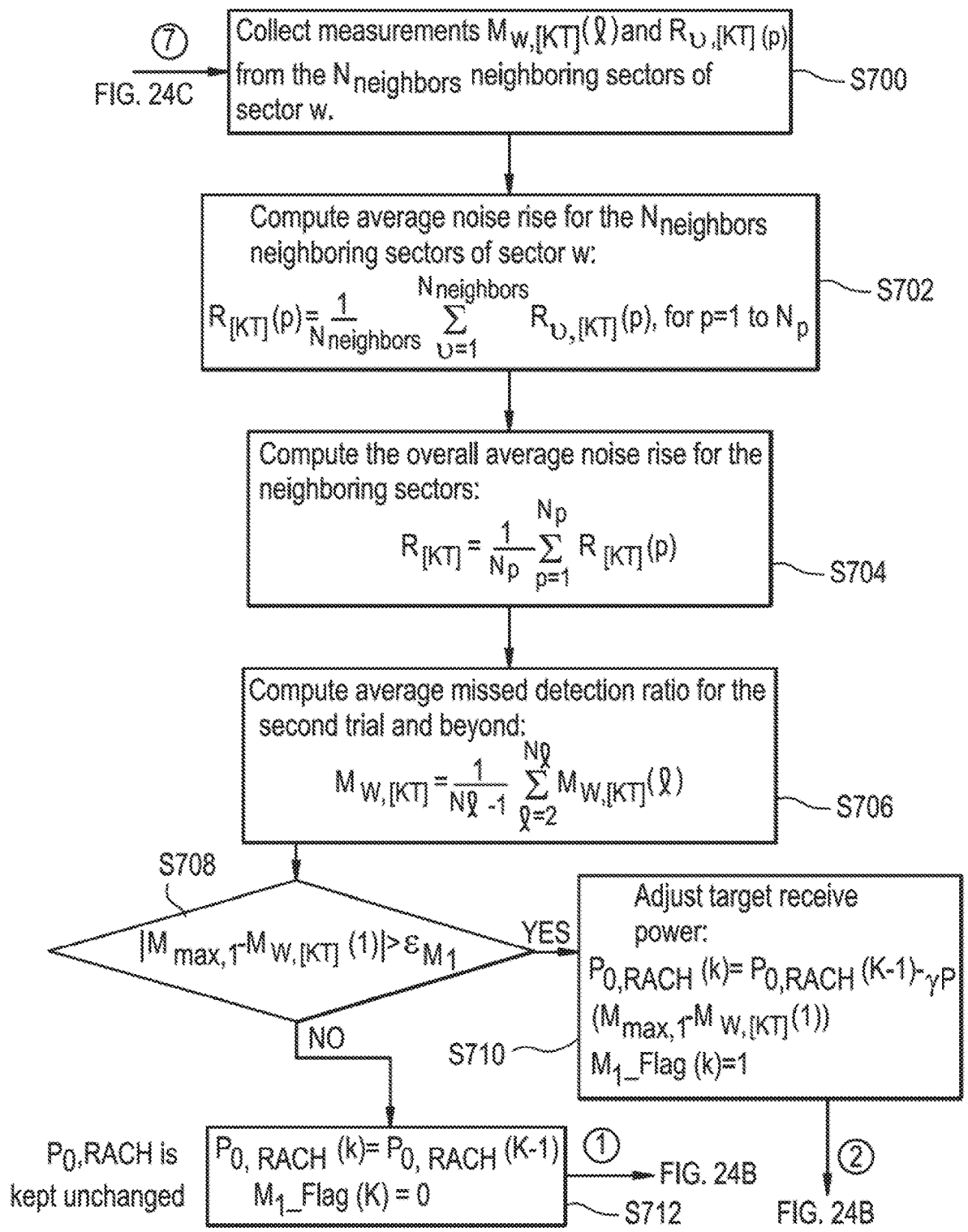
FIG. 24A illustrates a decentralized optimization of power, in accordance with an example embodiment.
Figure 24B:
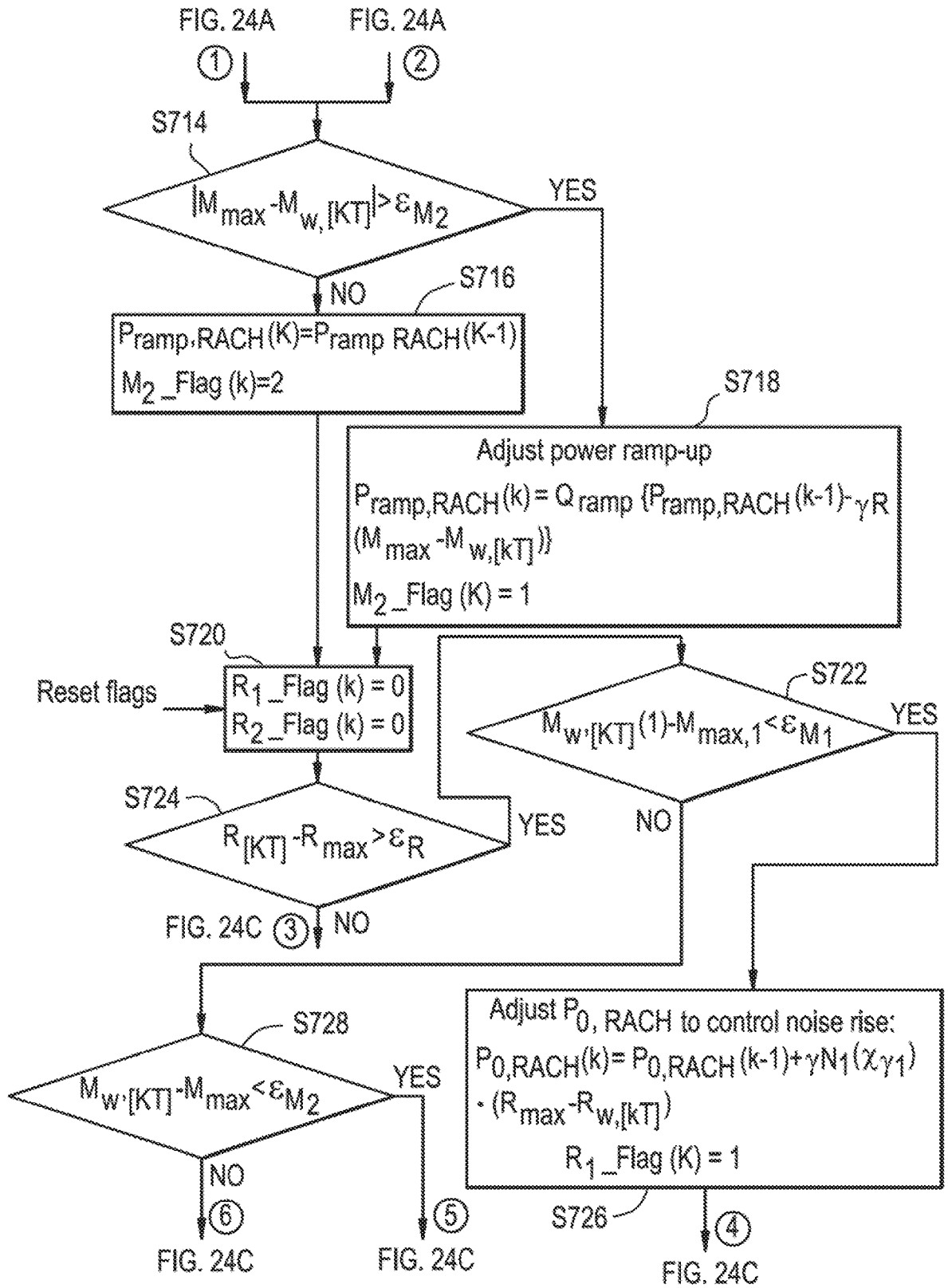
FIG. 24B illustrates a decentralized optimization of power, in accordance with an example embodiment.

In step S700 of FIG. 24A, a processor 210 for any one of the sectors w (associated with any of the eNB 105a1-105a5) may set k=1, and $x_{\gamma_1}=x_{\gamma_2}=N_\gamma$, prior to collecting measurements $M_{w,[kT]}(1)$ and $R_{v,[kT]}(p)$ from the $N_{neighbors}$ neighboring sectors of sector w. In step S702, the processor 210 may then compute an average noise rise for the $N_{neighbors}$ neighboring sectors of sector w. A counter p may correspond to physical resource blocks where Messages 1 and/or 3 (FIG. 26) may cause interference and $N_p$ may be a total number of such resource blocks for p=1 to $N_p$, using the relationship $R_{[kT]}(p)=(1/N_{neighbor})\Sigma_{v=1}^{N_{neighbor}}R_{v,[kT]}(p)$.

In step S704, the processor 210 may compute an overall average noise rise for the neighboring sectors using $R_{[kT]}=(1/N_p)\Sigma_{p=1}^{N_p}R_{[kT]}(p)$. In step S706, the processor 210 may then calculate an average missed detection ratio for the second trial (and further trials), using the relationship $M_{w,[kT]}=(1/N_I-1)\Sigma_{l=2}^{N_l}M_{w,[kT]}(l)$.

In step S708, the processor 210 may determine if $|M_{max,1}-M_{w,[kT]}(1)|>\epsilon_{M_1}$, and if so then the processor 210 may adjust an adjust target receive power $P_{0,RACH}(k)$, using $P_{0,RACH}(k)=P_{0,RACH}(k-1)-\gamma_P(M_{max,1}-M_{w,[kT]}(1))$, where $M_1\_\text{Flag}(k)=1$, in step S710. Otherwise, the processor 210 may calculate $P_{0,RACH}(k)=P_{0,RACH}(k-1)$, where $M_1\_\text{Flag}(k)=0$ in step S712.

Following step S710 or S712, the processor may determine adjust a power ramp $P_{ramp,RACH}(k)$ by determining in step S714 whether $|M_{max}-M_{w,[kT]}|>\epsilon_{M_2}$, where if this relationship holds true then in step S718 the processor 210 may adjust the power ramp by calculating $P_{ramp,RACH}(k)=Q_{ramp}\{P_{ramp,RACH}(k-1)-\gamma_R(M_{max}-M_{w,[kT]})\}$, where $M_2\_\text{Flag}(k)=1$. Otherwise, the processor 210 may adjust the power ramp by determining $P_{ramp,RACH}(k)=P_{ramp,RACH}(k-1)$, $M_2\_\text{Flag}(k)=0$ in step S716.

Following steps S716 or S718, the processor 210 may make adjustments in $P_{0,RACH}(k)$ or $P_{ramp,RACH}(k)$ to control the noise rise in the neighboring sectors by resetting flags $R_1\_\text{Flag}(k)=0$ and $R_2\_\text{Flag}(k)=0$ in step S720.

Following step S720, in step S724 the processor 210 may determine if $R_{[kT]}-R_{max}>\epsilon_R$, and if so then in step S722 the processor 210 may then determine if $M_{w,[kT]}(1)-M_{max,1}<\epsilon_{M_1}$ in step S726. If step S722 is answered in the affirmative, then in step S726 the processor 210 may determine $P_{0,RACH}(k)=P_{0,RACH}(k-1)+\gamma_{N_1}(x_{\gamma_1})\cdot(R_{max}-R_{[kT]})$, where $R_1\_$ Flag(k)=1 (in step S726). Otherwise, in step S728 the processor 210 may determine $M_{w,[kT]}-M_{max}<\epsilon_{M_2}$, in step S728.

In step S728, if the processor 210 makes the determination in the affirmative, then in step S730 the processor 210 may make adjustments to control a rise in noise by calculating $P_{ramp,RACH}(k)=Q_{ramp}\{P_{ramp,RACH}(k-1)+\gamma_{N_2}(x_{\gamma_2})\cdot(R_{max}-R_{[kT]})\}$, where $R_2\_Flag(k)=1$. Otherwise, in step S732 the method my continue where in step S732 the processor 210 may compute an intensity of a "ping-pong" situation for a last $N_\gamma$ sampling periods, where $x_{\gamma_1}=(\Sigma_{i=max(k-N_\gamma,1)}{}_k M_1\_Flag(k))-(\Sigma_{i=max(k-N_\gamma,1)}{}^k R_1\_Flag(k))$, and $x_{\gamma_2}=(\Sigma_{i=max(k-N_\gamma,1)}{}_k M_2\_Flag(k))-(\Sigma_{i=max(k-N_\gamma,1)}{}^k R_2\_Flag(k))$. Then, in step S734, the counter may increment (K=K+1), in order to progress to a next sample period.

Figure 25:
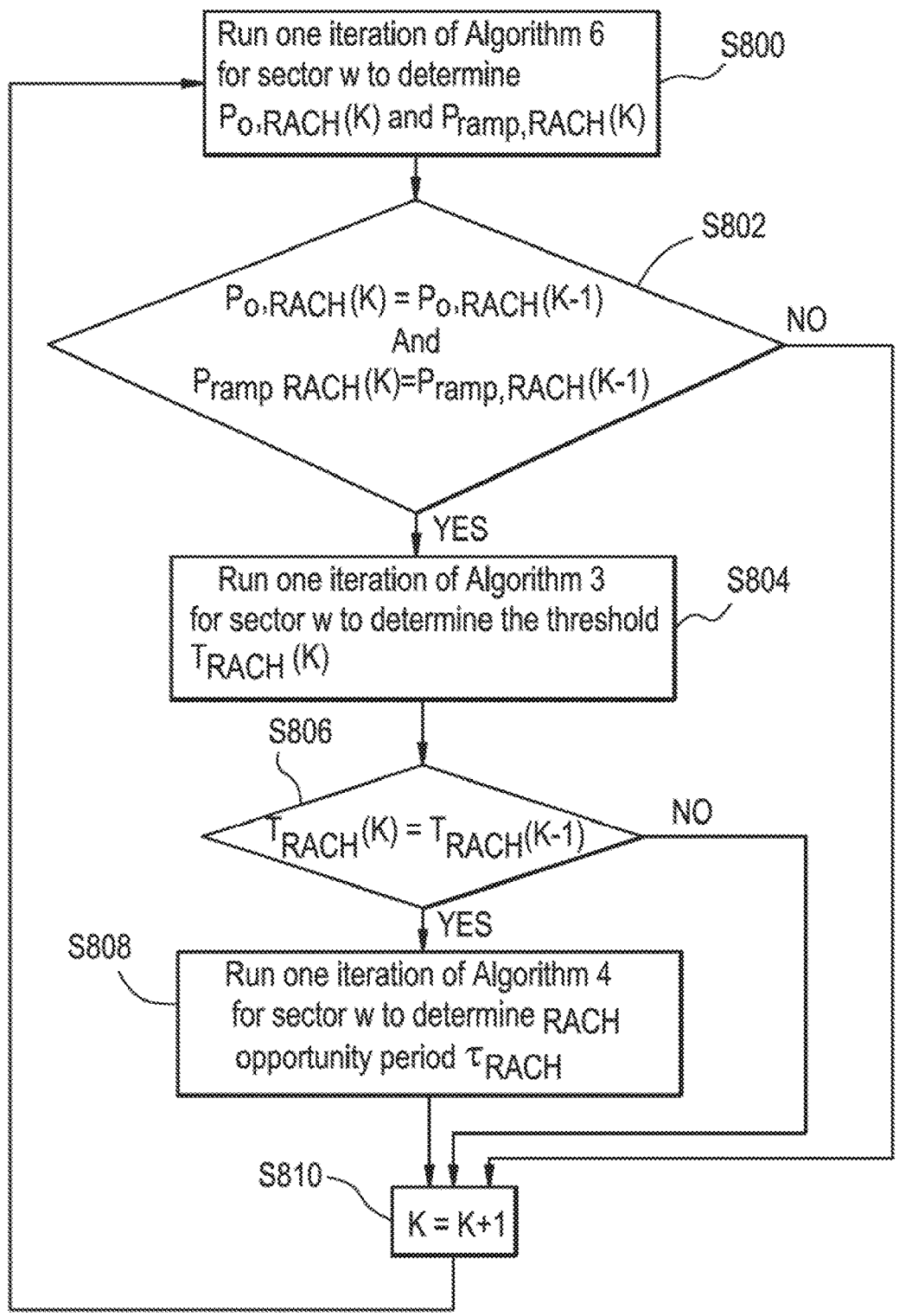
FIG. 25 illustrates a decentralized comprehensive RACH parameter optimization, in accordance with an example embodiment.

As in the centralized architecture shown in FIG. 10, a comprehensive RACH parameter optimization procedure may be implanted for each sector w. In the decentralized method for optimizing all RACH parameters, the method of FIGS. 24A-24C may be used for controlling $P_{0,RACH}$ and $P_{ramp,RACH}$, and the decentralized methods of FIGS. 18 and 21 may be used for controlling $T_{RACH}$ and $\tau_{RACH}$, respectively. FIG. 25 is a flowchart depicting a method of comprehensively optimizing RACH parameters in a decentralized hierarchy (as shown in FIG. 23).

In FIG. 25 (Algorithm 7), any of the processors 210 of the eNB 105a1-105a5 may perform these method steps. In step S800, the processor 210 may set k=1, and then perform an iteration of Algorithm 6 (FIGS. 24A-24B) for a sector w, where $[P_{0,RACH}(k), P_{ramp,RACH}(k)]$=Algorithm_6($P_{0,RACH}(k-1), P_{ramp,RACH}(k-1), R_{max}, M_{max,1}, M_{max}, \gamma_P, \gamma_R, \gamma_{N_1}, \gamma_{N_2}, \epsilon_{M_1}, \epsilon_{M_2}, \epsilon_R$). It is noted that other algorithms may run only when $P_{0,RACH}(k)$ and $P_{ramp,RACH}(k)$ are stable.

In step S802, the processor 210 may determine if $(P_{0,RACH}(k)=P_{0,RACH}(k-1))\wedge(P_{ramp,RACH}(k)=P_{ramp,RACH}(k-1))$, and if so then in step S804 the processor 210 may run an iteration of the decentralized version of Algorithm 3 (FIG. 18) for sector w, where $[T_{RACH}(k)]$=Algorithm_3($T_{RACH}(k-1), F_{max}, \alpha_{FA}, \epsilon_{FA}$). It should be noted that other algorithms may run only when $T_{RACH}(k)$ is stable. Otherwise, if the processor 210 does not determine step S802 to be in the affirmative, then processor 210 may end the method in step S810.

Following step S804, in step S806 the processor 210 may determine if $T_{RACH}(k)=T_{RACH}(k-1)$, and if so then in step S808 the processor may perform an iteration of the decentralized version of Algorithm 4 (FIG. 21) for sector w, where $[\tau_{RACH}(k)]$=Algorithm_4($\tau_{RACH}(k-1), C_{max}, \Delta_{col}, \epsilon_{col}$). Otherwise, the processor 210 ends the method (in step S810).

Following step S808, the processor 210 ends the method (in step S810).

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A user equipment, comprising:
a memory with computer-readable instructions; and
at least one first processor configured to read the computer-readable instructions, the at least one first processor being configured to,
receive a broadcast message, the broadcast message including random access channel, RACH, parameters,
transmit a first message following receipt of the broadcast message, the first message including RACH preambles,
receive a second message, the second message being an acknowledgement message that acknowledges receipt of the first message,
transmit a third message based on a successful transmission of the first message, the third message including noise rise information, preamble miss information and power settings for the user equipment, the power settings including power information used to transmit the third message,
receive a fourth message, the fourth message including contention resolution information that adjusts the RACH parameters based on the noise rise information and the preamble miss information,
decode RACH parameters and the contention resolution information to obtain decoded RACH parameters, and
adjust the initial transmit power of the user equipment to be a first transmit power based on the decoded RACH parameters.

2. The user equipment of claim 1, wherein the at least one first processor being is further configured to,
perform an initial cell synchronization process with a first network node prior to receiving the broadcast message.

3. The user equipment of claim 1, wherein the at least one first processor being is further configured to,
increase the initial transmit power of the user equipment to be a second transmit power based on the decoded RACH parameters.

4. The user equipment of claim 1, wherein the RACH parameters include at least one of an initial RACH target receive power and a RACH power ramp-up.

5. A method performed by a user equipment, comprising:
receiving, by at least one first processor of the user equipment, a broadcast message, the broadcast message including random access channel, RACH, parameters;
transmitting, by the at least one first processor, a first message following receipt of the broadcast message, the first message including RACH preambles;
receiving, by the at least one first processor, a second message, the second message being an acknowledgement message that acknowledges receipt of the first message;
transmitting, by the at least one first processor, a third message based on a successful transmission of the first message, the third message including noise rise information, preamble miss information and power settings for the user equipment, the power settings including power information used to transmit the third message;
receiving, by the at least one first processor, a fourth message, the fourth message including contention resolution information that adjusts the RACH parameters based on the noise rise information and the preamble miss information;
decoding, by the at least one first processor, RACH parameters and the contention resolution information to obtain decoded RACH parameters; and
adjusting, by the at least one first processor, an initial transmit power of the user equipment to be a first transmit power based on the decoded RACH parameters.

6. The method of claim 5, further comprising:
performing an initial cell synchronization process with a first network node prior to receiving the broadcast message.

7. The method of claim 5, further comprising:
increasing the initial transmit power of the user equipment to be a second transmit power based on the decoded RACH parameters.

8. The method of claim 5, wherein the RACH parameters include at least one of an initial RACH target receive power and a RACH power ramp-up.

\* \* \* \* \*